(12) United States Patent  (10) Patent No.: US 8,089,515 B2
Chebil et al.  (45) Date of Patent: Jan. 3, 2012

(54) METHOD AND DEVICE FOR CONTROLLING AUTO FOCUSING OF A VIDEO CAMERA BY TRACKING A REGION-OF-INTEREST

(75) Inventors: Fehmi Chebil, Irving, TX (US); Mohamed Khames Ben Hadj Miled, Woburn, MA (US); Asad Islam, Richardson, TX (US)

(73) Assignee: Nokia Corporation, Espoo (FI)

( * ) Notice: Subject to any disclaimer, the term of this patent is extended or adjusted under 35 U.S.C. 154(b) by 583 days.

(21) Appl. No.: 12/087,207

(22) PCT Filed: Dec. 30, 2005

(86) PCT No.: PCT/FI2005/050495
§ 371 (c)(1),
(2), (4) Date: Mar. 30, 2009

(87) PCT Pub. No.: WO2007/077283
PCT Pub. Date: Jul. 12, 2007

(65) Prior Publication Data
US 2010/0045800 A1  Feb. 25, 2010

(51) Int. Cl.
*H04N 5/225* (2006.01)
(52) U.S. Cl. .......................... 348/169; 382/103; 382/168
(58) Field of Classification Search .................. 348/169; 382/103, 168
See application file for complete search history.

(56) References Cited

U.S. PATENT DOCUMENTS

| 5,552,823 | A | 9/1996 | Kageyama |
| 5,631,697 | A * | 5/1997 | Nishimura et al. ........... 348/172 |
| 5,812,193 | A | 9/1998 | Tomitaka et al. |
| 6,088,060 | A * | 7/2000 | Suda et al. ..................... 348/350 |
| 6,130,964 | A | 10/2000 | Marques et al. |
| 6,226,388 | B1 | 5/2001 | Qian et al. |
| 6,844,818 | B2 * | 1/2005 | Grech-Cini ................... 340/628 |
| 6,901,110 | B1 | 5/2005 | Tsougarakis et al. |
| 2004/0004670 | A1 * | 1/2004 | Yamashita .................... 348/345 |
| 2004/0091158 | A1 * | 5/2004 | Miled et al. ................... 382/236 |

(Continued)

FOREIGN PATENT DOCUMENTS

EP    1560425    8/2005

(Continued)

OTHER PUBLICATIONS

Office action dated May 13, 2011 from European Application No. 05821826.4, 7 pages.

(Continued)

*Primary Examiner* — Abdullahi Salad
(74) *Attorney, Agent, or Firm* — Hollingsworth & Funk, LLC

(57) ABSTRACT

The invention concerns an electronic device equipped with a video imaging process capability, which device includes a camera unit arranged to produce image frames from an imaging view which includes a region-of-interest ROI, an adjustable optics arranged in connection with the camera unit in order to focus the ROI on the camera unit, an identifier unit in order to identify a ROI from the image frame, a tracking unit in order to track the ROI from the image frames during the video imaging process and an auto-focus unit arranged to analyze the ROI on the basis of the tracking results provided by the tracking unit in order to adjust the optics. The device is arranged to determine the spatial position of the ROI in the produced image frame without any estimation measures.

36 Claims, 13 Drawing Sheets

U.S. PATENT DOCUMENTS

| | | |
|---|---|---|
| 2004/0212723 A1 | 10/2004 | Lin |
| 2005/0031325 A1 | 2/2005 | Fujii |
| 2005/0270408 A1 | 12/2005 | Kwon et al. |
| 2005/0270410 A1 | 12/2005 | Takayama |

FOREIGN PATENT DOCUMENTS

| | | |
|---|---|---|
| JP | 6294987 | 10/1994 |
| JP | 2003075717 | 3/2003 |

OTHER PUBLICATIONS

Office action dated Jul. 14, 2010 from Japanese Application No. 2008-547998, 10 pages.

Micron Technology, "½-Inch 3-Megapixel CMOS Digital Image Sensor", Jul. 31, 2005.

The Office Action of parallel European application No. 05817665.2 dated Jan. 7, 2010.

* cited by examiner

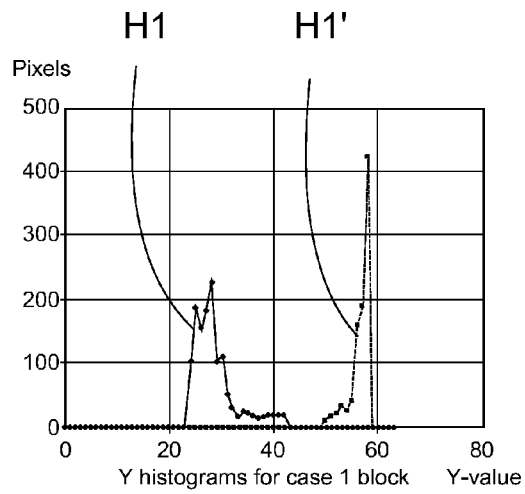
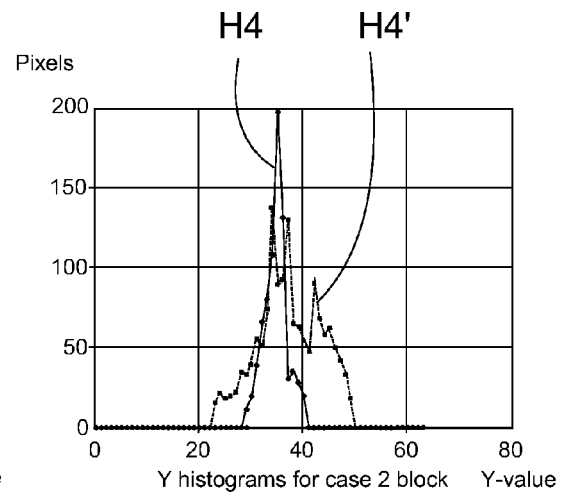
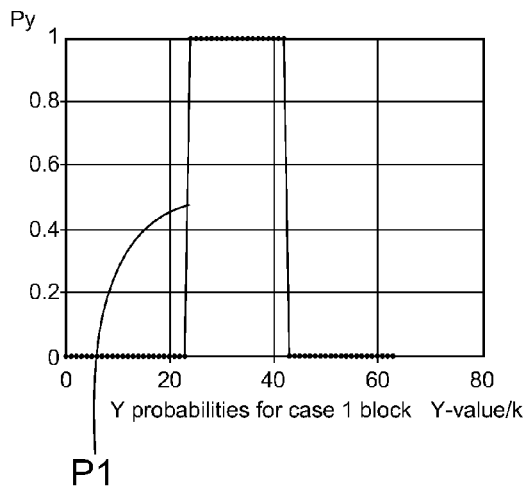
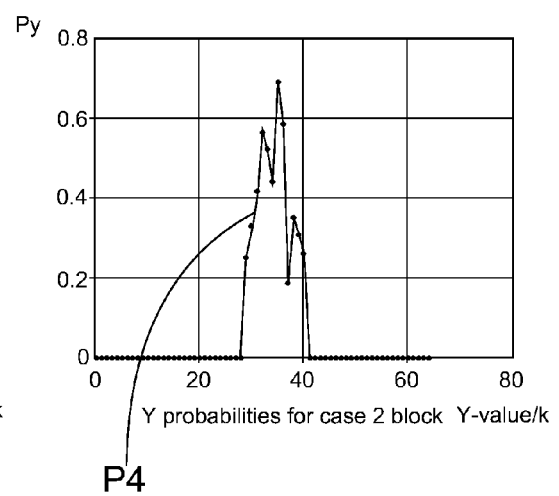
Fig. 13a      Fig. 13b

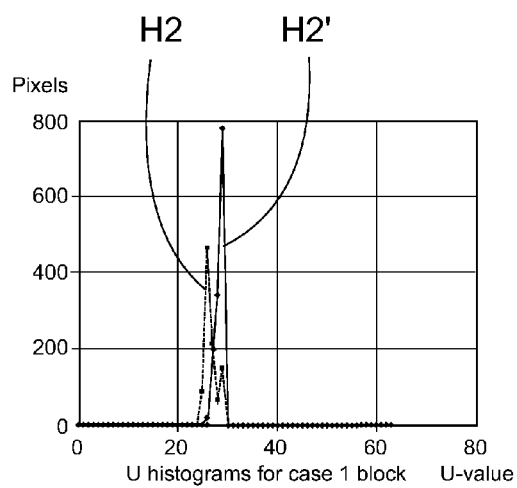
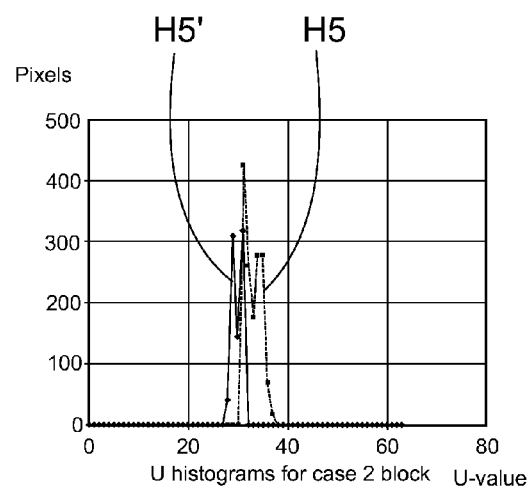
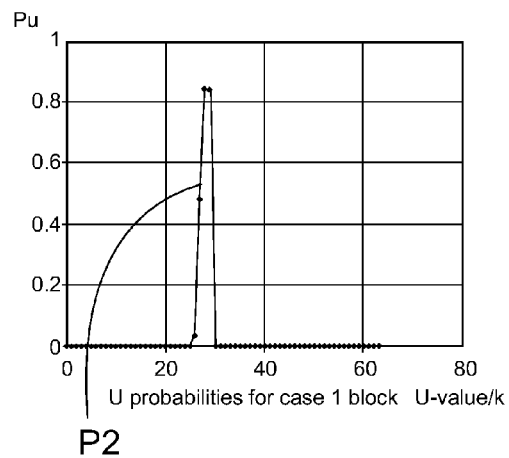
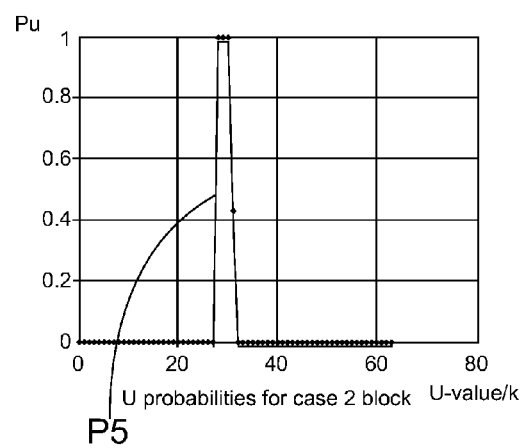
Fig. 13c                Fig. 13d

METHOD AND DEVICE FOR CONTROLLING AUTO FOCUSING OF A VIDEO CAMERA BY TRACKING A REGION-OF-INTEREST

FIELD OF THE INVENTION

The present invention relates to an electronic device equipped with a video imaging process capability, which device includes
- a camera unit arranged to produce image frames from an imaging view which includes a region-of-interest ROI,
- an adjustable optics arranged in connection with the camera unit in order to focus the ROI on the camera unit,
- an identifier unit in order to identify a ROI from the image frame,
- a tracking unit in order to track the ROI from the image frames during the video imaging process and
- an auto-focus unit arranged to analyze the ROI on the basis of the tracking results provided by the tracking unit in order to adjust the optics.

In addition, the invention also relates to a method and a corresponding program product.

BACKGROUND OF THE INVENTION

In FIG. 1a has been presented a prior art example of the generic architecture of a passive auto-focus system arranged in connection with a digital imaging system 10'. Generally speaking, auto-focus 12 is the procedure of moving of the lens 14 in and out until the sharpest possible image I of the subject T is obtained. Depending on the distance of the subject T from the camera 10', the lens 14 has to be at a certain distance from an image sensor 11 to form a clear image I.

More particular, the image sensor 11 of the device 10' produces (image) data I for the auto-focus unit 12. Auto-focus unit 12 calculates parameters for motor 13 adjusting the position of the lens 14 on the basis of the data. The motor 13 adjusts the lens 14 owing to which the captured image I is more accurate. Of course, other architectures are also possible. There are two main approaches for auto-focus in the prior art, an active auto-focus, AAF and a passive auto-focus, PAF.

In the active auto-focus, which is the more expensive, the camera emits a signal to the direction of the object (or scene) to capture in order to detect the distance of the subject. The signal could be a sound wave, as it is the case in submarines under water, or an infrared wave. The time of the reflected wave is then used to calculate distance. Basically, this is similar to the Doppler radar principle. Based on the distance the auto-focus unit then tells the focus motor which way to move the lens and how far to move it.

However, there are several problems with this AAF approach, besides the costs. In using infrared, the subject has to be in the middle of the frame. Otherwise the auto-focus will be fooled by receiving reflected waves from other objects. The reflected beams could also come from objects in front of the subject, if user is taking a photo, for example, from behind a barrier, in a stadium. Any source of bright objects in the scene will also make it difficult for the camera to receive the reflected waves.

In the passive auto-focus, PAF, the cameras determine the distance to the subject by analyzing the image. The image is first captured, and through a sensor, dedicated for the auto-focus, it is analyzed. Usually the sensor specific for the auto-focus use, has a limited number of pixels. Thus, a portion of the image, only, is often utilized.

A typical auto-focus sensor applied in PAF is a charge-coupled device (CCD). It provides input to algorithms that compute the contrast of the actual picture elements. The CCD is typically a single strip of 100 or 200 pixels, for example. Light from the scene hits this strip and the microprocessor looks at the values from each pixel. This data is then analyzed by checking the sharpness, horizontally or vertically, and/or its contrast. The obtained results are then sent as a feedback to the lens, which is adjusted to improve the sharpness and the contrast. So, for example, if the image is very blurred then it is understood that the lens needs to move forward in order to adjust the focus.

The same technique could be used for videos as well. However, in capturing videos, there are several use cases, where an object of interest is needed to be tracked and focused on during recording process. In videos objects of interest are often moving. The movement may happen either in the same plane of the captured scene, or backward or forward with respect to the camera position. The challenge is how to maintain the focus on an object while shooting a video.

In the literature, different techniques were used for object identification and ROI tracking process initialization. Such a problem arises in many applications such as the initialization of region of interest (ROI) tracking in a video sequence. In the particular case where only human faces are targeted, the skin color information is used to detect the foreground. Some approaches apply feature-based refinement to distinguish faces from other parts of the body with similar color characteristics, e.g. hands. Such methods cannot be applicable in the general case where the target can be of any type, such as, for example, a car, an airplane, an athlete, an animal, etc. In the case where the target is not necessarily of a particular type, e.g. human face, but can rather be any object, the identification can not be done automatically and user input becomes imminent.

As a matter of fact, in order to perform any ROI-based editing/tracking, the target has to be differentiated from the background. Other semi-automatic alternatives require quite complex input from the end-user. The latter is expected to select points on the boundary of the ROI, which will be used as input for automatic segmentation. The user still can supervise the result of segmentation and provide feedback, if necessary. This type of user-interaction is not trivial and might be considered as tedious for the typical mobile device user. Such approach might make any related application experience unpleasant. Besides, the problem of image/frame segmentation has no simple solution yet and most reliable methods are of high computational complexity.

In addition to the above, when the ROI has been first identified then a tracking process is performed in order to localize the ROI in each frame. Generally speaking, visual tracking of non-rigid objects in a video sequence can be seen as a recursive-matching problem from which certain reliability is required. At each time step, a region in the current frame is matched to a previous instance, or a model, of the target.

The difficulty of the tracking problem is of multiple dimensions. In real life, 3D objects captured on a 2D video frame do not capture the depth of the objects. Changes in the object that occur with time, such as translation, rotation, deformation, etc., are not captured faithfully on the 2D screen. Tracking the object while it undergoes these changes is a challenging task.

Firstly, variability in the target's location, shape and texture and the changes in the surrounding environment make target recognition a very challenging task. More precisely, the object may also be affected by its surroundings and other external factors. Some examples of these are interference with other objects, occlusions, changes in background and lighting conditions, capturing conditions, camera motion, etc. All these numerous factors impede a robust and reliable tracking mechanism of the object-of-interest.

Secondly, the matching can be done based on the colour, shape or other features. Methods based on one of these aspects usually provide robustness in one sense but show weaknesses under some other scenarios. Finally, the tracking of shapes and features involves significant computational load. Therefore, algorithms that consider more than one multiple visual aspect of the target can enhance tracking performance but at the expense of higher computational load.

Existing tracking methods can be classified as colour-based, shape-based, motion-based or model-based. The latter usually relies on multiple features, i.e. colour, motion, shape and texture details. Methods using colour content usually are computationally simple. However, their drawback is mainly the false alarms generated when the target shares some colour contents with a neighbouring background region. In such a scenario, the tracked region can falsely expand or split into two distinct regions and the tracking starts degrading. In the literature, shape and feature based methods are usually computationally complex and memory-inefficient. The main sources of complexity are the modelling of such features and the matching of the model, e.g. edge matching, contour representation and matching, etc.

Examining most of the proposed tracking methods, one can conclude that tracking robustness is usually associated with very high computational complexity. This is not a feasible approach for mobile devices, for example, with limited computational power. Hence, there is a need for a new solution that provides robust tracking with low complexity algorithms.

SUMMARY OF THE INVENTION

The present invention is intended to create a new type of electronic device equipped with video imaging process capability and auto-focus means, as well as an auto-focus method for video imaging. The characteristic features of the electronic device according to the invention are stated in the accompanying Claim 1 while the characteristic features of the method applied in it are stated in Claim 17. In addition, the invention also relates to a program product, the characteristic features of which are stated in the accompanying Claim 33.

The invention describes algorithms to utilize in the auto-focus modules in cameras to improve video capturing. The approaches are based on utilizing a region of interest tracking technique to identify the optimal parameters for focus control.

The invention provides means for efficiently keeping the focus on an object during video recording process. The invention is composed of an algorithm for identifying an object, tracking it and an auto-focus unit which uses the tracking results to control the lens system.

The invention optimizes the performance of the passive auto-focus lens by introducing a region of interest tracking technique, which makes the object of interest sharp and with the same size in proportion to the video frames along the video sequence. The technique can be implemented, for example, within an auto-focus unit. With the ROI tracking results a more accurate update on the lens movements is reached, while the camera is recording the auto-focus is done automatically.

According to one embodiment the region-of-interest (ROI) tracking in a video sequence is performed applying macroblock-based region-of-interest tracking method. In that two histograms may be calculated in order to find out which pixels of the current macroblock of the current image frame are target pixels and which pixels are background pixels. The histograms are calculated for the ROI region and for the background region of the previous frame. The information which regions belong to the ROI and which regions belong to background have been achieved from the ROI mask of the previous frame.

Additionally, according to the invention it is also possible to perform a simple shape matching procedure if there is color similarity between the target and the background regions inside the current macroblock. The invention describes a new approach characterized by tracking robustness and low computational complexity. These two features are the main measures of whether or not a tracking technique is implementable in an application targeting mobile devices where system resources are very limited. The tracking scheme according to the invention provides robustness to shape deformation, partial occlusion and environment variations while maintaining a low computational complexity with reliable and efficient performance.

According to one embodiment in connection with the invention it is also possible to apply a semi-automatic identification of an object or a region of interest (ROI) in an image or a video frame. According to this solution, it is possible to define an area around the ROI and the target is then automatically identified by the device. Defining may be performed by the user or by the device. Owing to this is guaranteed a robust identification while keeping the end-user interaction with the system fairly simple.

In this identification process the local color-content inside and around the defined area including the object of interest is analyzed in order to distinguish between background and target. The output of this process may be a mask describing the ROI. Computationally, the developed algorithm is quite simple.

Other features characteristic of the electronic device, method, and program product according to the invention will become apparent from the accompanying Claims, while additional advantages achieved are itemized in the description portion.

DESCRIPTION OF THE DRAWINGS

In the following, the invention, which is not restricted to the embodiment disclosed in the following, is examined in greater detail with reference to the accompanying figures, in which FIGS. 13a-13f show examples of the color componentwise and probability histograms from the real imaging situation presented in FIGS. 12a and 12b.

DETAILED DESCRIPTION OF THE INVENTION

Nowadays, many electronic devices 10 include camera means 11. Besides digital video cameras, examples of such devices include mobile stations, PDA (Personal Digital Assistant) devices, and similar 'smart communicators' and also surveillance cameras. In this connection, the concept 'electronic device' can be understood very widely. For example, it can be a device, which is equipped, or which can be equipped with a digital video imaging capability. In the following, the invention is described in connection with a mobile station 10, by way of example.

Figure 1A:
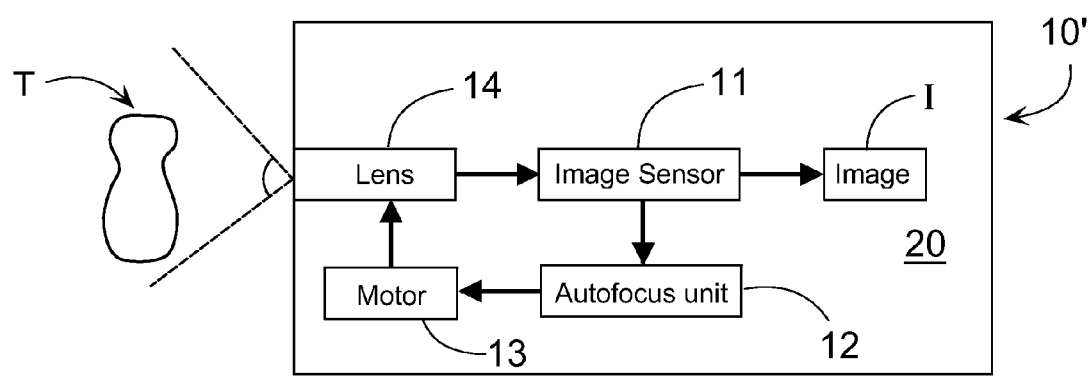
FIG. 1a shows a principle of a generic architecture of a passive auto-focus system according to the prior art.
Figure 1B:
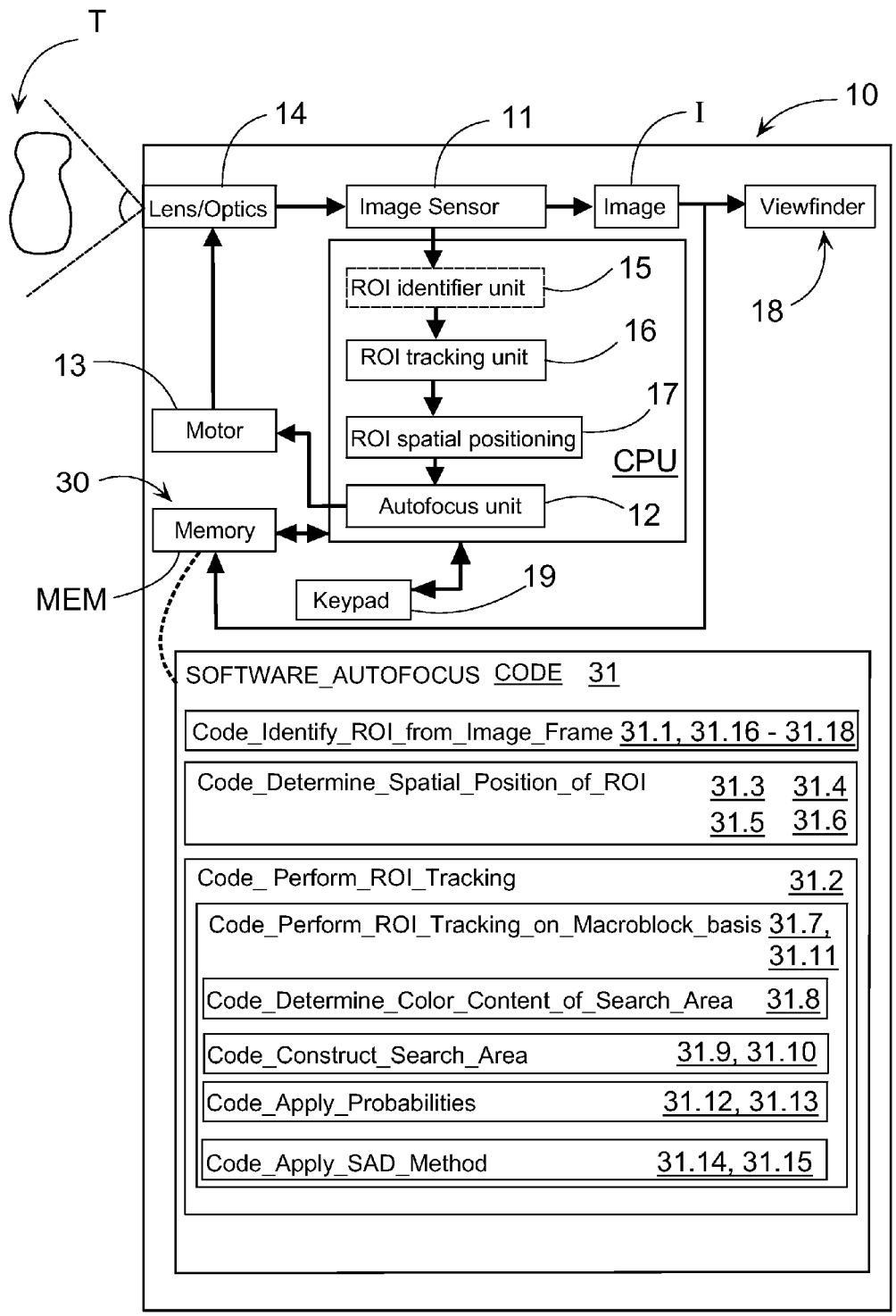
FIG. 1b shows a principle of a device according to the invention in which the identification and the tracking of the ROI is applied in connection with the determination of the spatial position of the ROI.

FIG. 1b shows a rough schematic example of the functionalities in a device 10, in as much as they relate to the invention. The camera means of the device 10 can include the functional components or sub-modules 11-14, which are, as such known, shown in FIG. 1b and already described in connection with FIG. 1a in the prior art section. These modules 11-14 form a loop architecture, which is performed continuously in connection with the video recording. Here the video recording may be understood as well as the measures that are performed before the actual recording process (initialization measures) and also during the actual recording in which storing or network streaming of the video data is performed.

At least part of the functionalities of the camera may be performed by using data-processing means, i.e. CPU 15-17. This may include one or more processor units or corresponding. As an example of these the image processor CPU may be mentioned with the auto-focus unit 12 included in that. Of course, the auto-focus unit 12 may also be a separate entity which communicates with main processor CPU. By means of these processors CPU, 15-17 the program product 30 is implemented on either the HW or SW level, in order to perform actions according to the invention.

Further, the device 10 can also include a display/viewfinder 18 on which information can be visualized to the user of the device 10. In addition, the device 10 also includes a processor functionality CPU, which includes functionalities for controlling the various operations of the device 10.

The actions relating to the auto-focusing process according to the invention can be performed using program 30. The program 30, or the code 31 forming it can be written on a storage medium MEM in the device 10, for example, on an updatable, non-volatile semiconductor memory, or, on the other hand, it can also be burned directly in a circuit CPU, 15-17 as an HW implementation. The code 31 consists of a group of commands 31.1-31.18 to be performed in a set sequence, by means of which data processing according to a selected processing algorithm is achieved. In this case, data processing can be mainly understood actions and measures relating to ROI identification 15 that is performed before storing video recording process. Data processing means also in this connection the measures and actions performed by the ROI tracking 16, determination process 17 of the spatial position of the ROI in the video frame and also an auto-focusing process 12. These three actions are all performed during the actual video recording process, as will be explained in later in greater detail.

Figure 2:
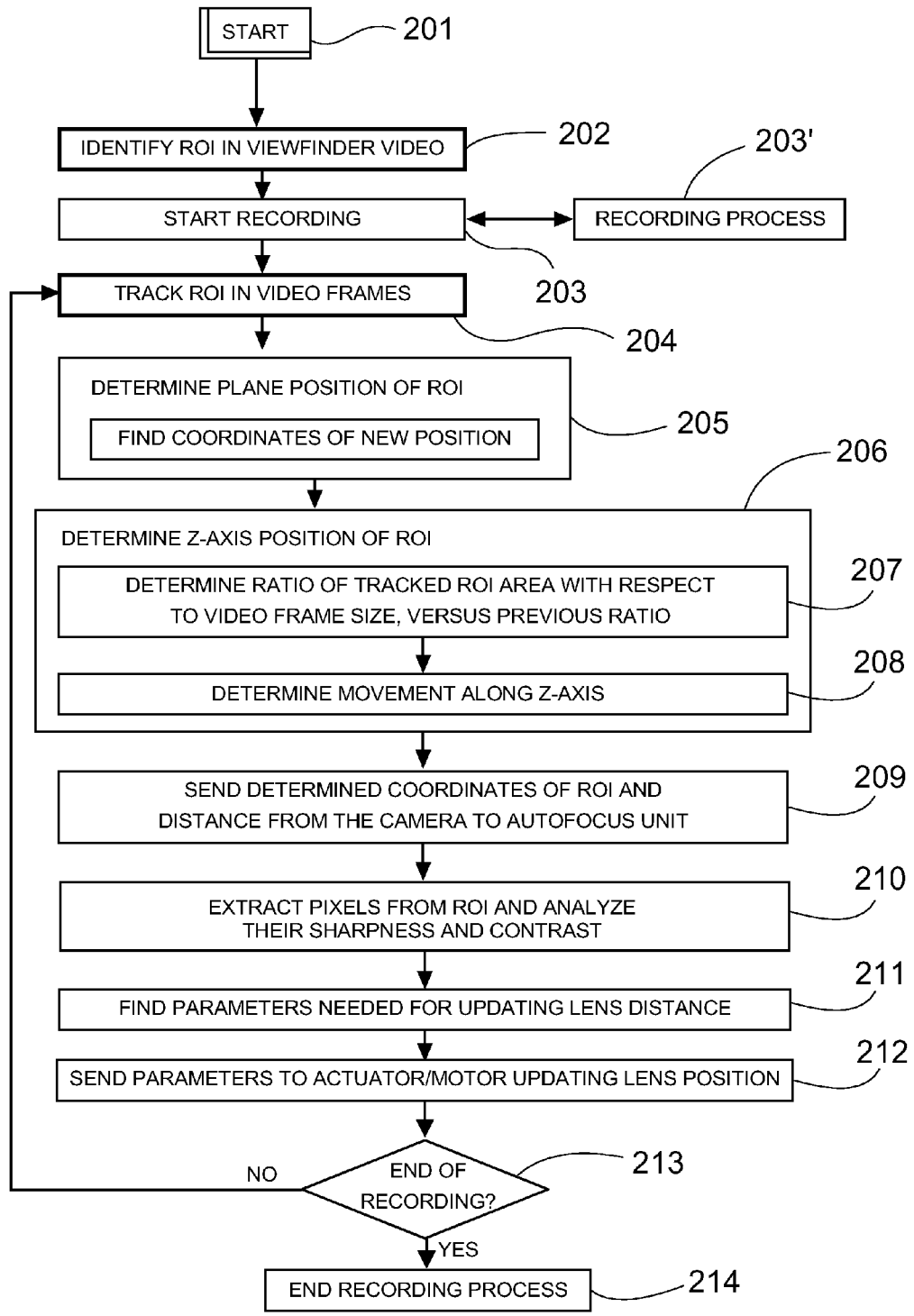
FIG. 2 shows an example of the method according to the invention as a flowchart.

Next the invention is described in a more detailed manner referring to FIG. 2. FIG. 2 presents as a flowchart an example of the main stages of the invention. One should understand that the basic idea of the invention is not intended to be limited to these steps or their performance order. In addition, other additional steps may also become into the question and/or the performance order of the presented (or currently not presented) steps may also vary, if that is possible. There may also be sub-processes, like the ROI tracking 204 that is performed independently relative to the other steps (code means 31.2, 31.7). Owing to this the ROI tracking 204, 16 provides always the most refresh ROI mask for the unit 17 that determines the spatial position of the ROI in a frame and which provides that coordinate information for the auto-focus unit 12.

The method according to the invention may be built on top of a passive auto-focus method if the invention is applied in connection with the video capturing process. The method is basically divided into stages (tracking and updating the lens, or in general, optics 14).

When generally describing the method according to the invention, during the video capturing process, an object of interest is first identified. This identification may be performed either by the user aided or totally automatically by the device 10. The region of interest is a target defined by a user or an application in a frame in a video sequence. The object T is made the interest of the camera lens 14 and the focus is operated to get the sharpest image quality of this object. As the object T is moving, the region-of-interest (ROI) tracking algorithm 16 is following it and sending feedback parameters to the auto-focus actuator (motor) 13 to move the auto-focus lens 14 accordingly backward or forward depending on the current situation.

In a given video sequence, a user might be interested in a specific object in the sequence, e.g. a person, an animal, a motor vehicle, etc. After start stage 201, in which the user turns on the viewfinder 18 of the device 10, stage 202 may be performed where the region-of-interest is identified in the viewfinder video (code means 31.1). This procedure may include several sub-stages which are described in more details in connection with FIG. 5 which is explained more precisely hereinafter. Of course, other methods may also be applied in this ROI identification process. The invention is not intended to limit this to the embodiment presented in FIG. 5.

Once the ROI is properly identified in stage 202, the video capturing process starts in order to produce video for the desired purpose (for example, for storing to the memory MEM or for streaming to the network) (stage 203). The captured video image data, i.e. the video frames, are processed at stage 203' as a manner known as such after which they are stored to the memory MEM of the device 10, for example.

On the same time of the possible recording process, auto-focus is also performed in the loop 204-213 in order to adjust the focus lens system 14 and keep the target in the image as sharp as possible. As a first stage 204 in this loop tracking of the ROI is performed in the current video frame by the ROI tracking unit 16. This ROI tracking stage 204 also includes several sub-stages which are also described as an embodiment more precisely in a little bit later. Basically any method may be used in this connection.

Figure 3:
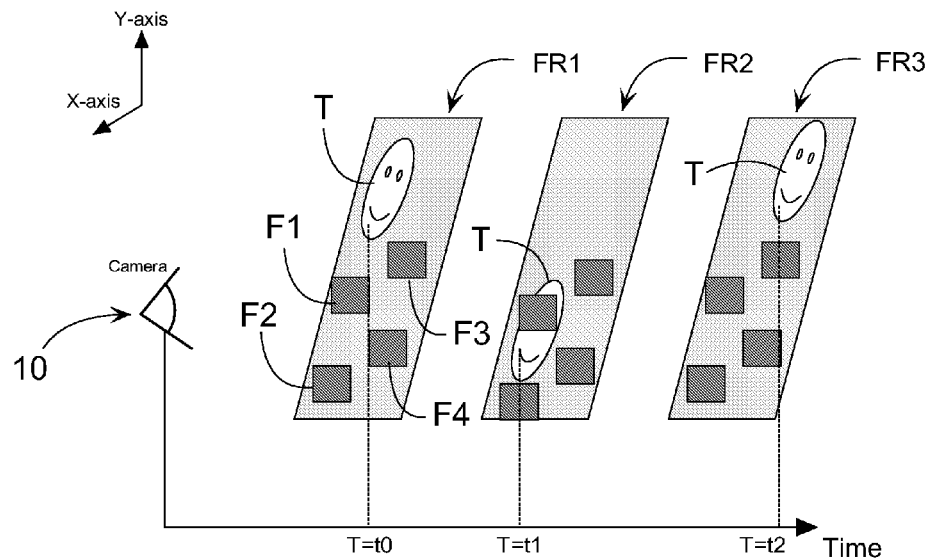
FIG. 3 shows an illustration of the ROI tracking in the scene plane.

Owing to the ROI tracking stage 204 achieved data/results may be used in the next stage 205 that is the determination of the plane position of the ROI (code means 31.3, 31.4). In FIG. 3 an example of the determination of the plane position of the ROI has been presented. Three frames FR1-FR3 has been presented each of which represents a different time point T=t0, t1, t2 during the recording process. The frame FR1 only exists on this current loop cycle. There the head T is the ROI, i.e. the target, and its spatial position in the X-Y plane may vary between the frames FR1-FR3 during the recording process. In this stage 205 the XY-coordinates of the ROI's new position in the image frame FR1-FR3 are found. This information is then applied in connection with the auto-focus stage 210.

Figure 4:
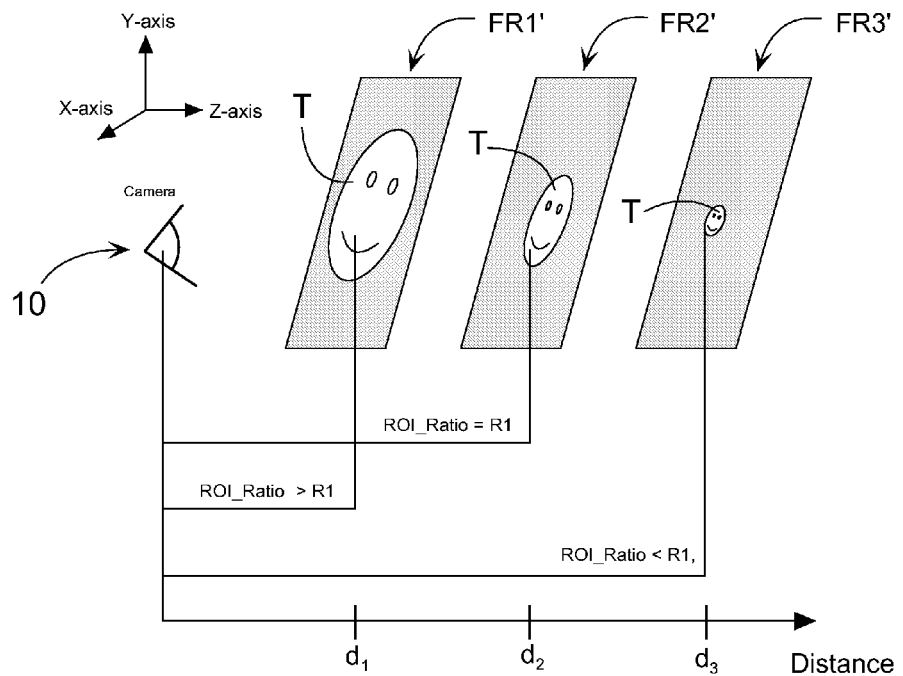
FIG. 4 shows an illustration of the ROI tracking in the Z-plane.

As a next stage 206 the spatial position of the ROI T along the Z-axis is determined (code means 31.3, 31.5). This is performed in order to detect the movement of the ROI T in depth of the imaging view (code means 31.5). FIG. 4 presents an example relating to that. There has been presented three different cases which may again represent different time moments. The middle frame FR2' presents the size of the target T at initial capturing point. The frames may be achieved, for example, from the stage 202, or from each loop cycle if the shape of the ROI changes during recording process. The ROI_ratio i.e. the initial (or current) size ratio of the ROI relative to the frame size may be named R1. The ROI_ratio at the each moment may be defined to be ROI_ratio= (ROI Area)/(number of pixels in the frame). Here the ROI Area means the number of the pixels of the ROI.

As a sub-stage 207 of the stage 206 the ratio of the tracked ROI area with respect to the video frame size (=ROI_ratio_current) is determined, and compared to the previous ratio obtained from some of the older frames (=ROI_ratio_old). In this connection it is also possible to apply the information on the size of the ROI (for example, the horizontal and vertical dimensions). This is important if the shape of the ROI changes during the recording process.

In sub-stage 208 an evaluation of how much movement on Z-axis took place between the consecutive frames FR1'-FR3' is performed. This is performed by analyzing the size ratio of the ROI T, with respect to frame size, between produced consecutive image frames (FR1'-FR3'). Using the ROI size variation results, the lens system 14 is adjusted in an established manner (code means 31.6). More precisely, if the current ROI_ratio is greater than R1 (i.e. the target is nearer relative to the device 10 than desired/originally) then the lens 14 must be instructed to move backward. Owing to this the desired/original situation i.e. the size ratio R1 of the ROI in the frame FR2' is achieved. Example of that kind of situation is presented in frame FR1'. If the ROI_ratio is less than R1 (i.e. the target is farther relative to the device 10 than desired/originally) then the lens 14 must be instructed to move forward. Owing to this the desired/original situation i.e. the size ratio R1 of the ROI in the frame FR2' is achieved. This situation is presented in the frame FR3'.

The advantage achieved owing to the determination of the size ratio of the ROI in the current frame relates to the ROI tracking stage 204. In the invention instead of estimating XY-position or distance of ROI in next future frame that is not yet even captured, the adjusting of the auto-focus 14 is based on the current measured values i.e. realized image content. Owing to the Z-axis determination of the target T the adjustment takes into account the area ratio of ROI with respect to whole frame and implicitly takes into account target motion by keeping enough space between target boundaries and frame boundaries. This will guarantee that ROI will stay in focus in the next frame without doing any estimation.

In stage 209 the coordinates of the ROI and the distance of the ROI from the camera 10 is sent to the auto-focus unit 12.

In stage 210 the auto-focus unit 12 extracts the pixels from the ROI, analyzes their sharpness and contrast. This may be performed by using the whole area of the ROI or at least part of the ROI. FIG. 3 illustrates an embodiment in which only portions of the ROI are analyzed and used for fixing the auto-focus 12. In the area of the frame FR1-FR3 there are projected squares F1-F4 or, in generally, areas which may be understood as focus points. One understands that they may cover the frame FR1-FR3 mainly and evenly. Because the size ratio of the ROI is continuously adjusted to be reasonable relative to the frame size, the ROI or at least part of that is always on the area of one or more of the focus point F1-F4 covering that at least partly. For example, in frame FR2 the ROI is in the area of F1 and only the data of the ROI of that area F1 is then used in the sharpness and contrast analysis. This also reduces the need for calculation power.

In stage 211 the unit 12 finds the parameters needed for updating the distance of the lens 14 from the target T. The auto-focus unit 12 uses as well the movement in the Z-direction to update the new position of the lens 14.

In stage 212 the results/parameters determined by the auto-focus unit 12 is sent to the actuator/motor 13 in order to update the lens 14 position. This updating of the position of the lens 14 is not presented in details in this flowchart because that may be performed in a well known manner. In stage 213 the status of the recording process is checked, whether it still continues or if that is already finished. If recording process still continues a step to stage 204 is then performed. There the current (i.e. the latest captured frame, T=$t_1$, FIG. 3) frame FR2 is taken to the ROI tracking process 16.

If in stage 213 an end of recording is noticed then the process will be terminated to stage 214.

Figure 5:
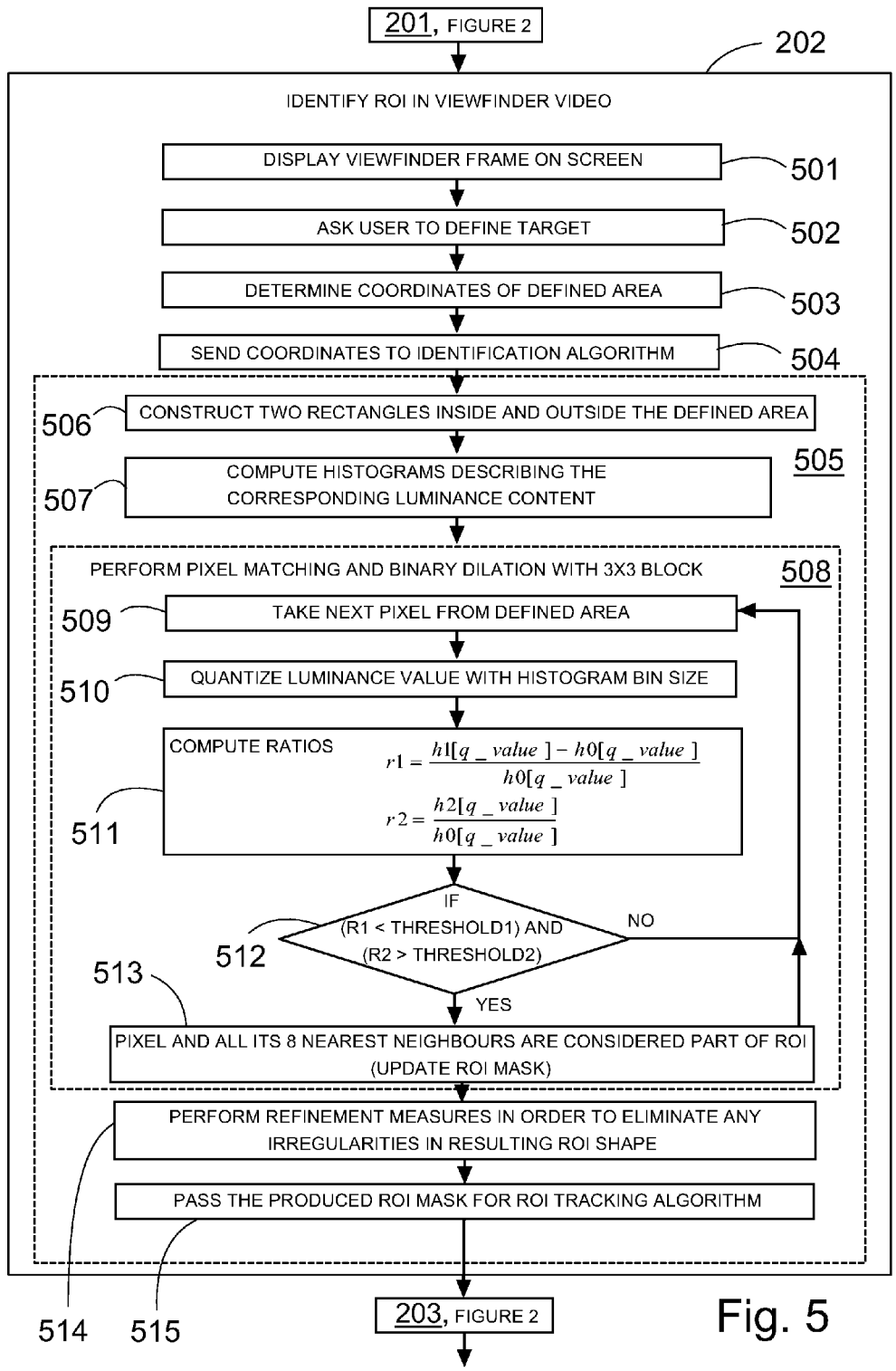
FIG. 5 shows an example of the ROI identification process according to the invention as a flowchart.

Identification of the ROI (Stage 202):

Next is described an example of how the identification stage 202 of the ROI may be performed according to one embodiment. FIG. 5 presents as an example a flowchart how these sub-stages of main stage 202 may be implemented. The device 10 presented in FIG. 1b is equipped with corresponding functionality 15 which may be based on processor CPU and program codes 31.1, 31.16-31.18 executed by that.

Figure 6A:
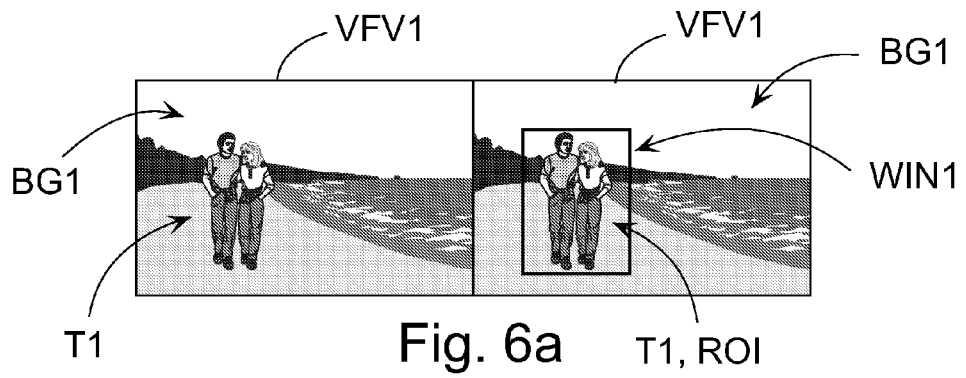
FIGS. 6a and 6b show examples of the window selection procedure in order to define the area including the object of interest.
Figure 6B:
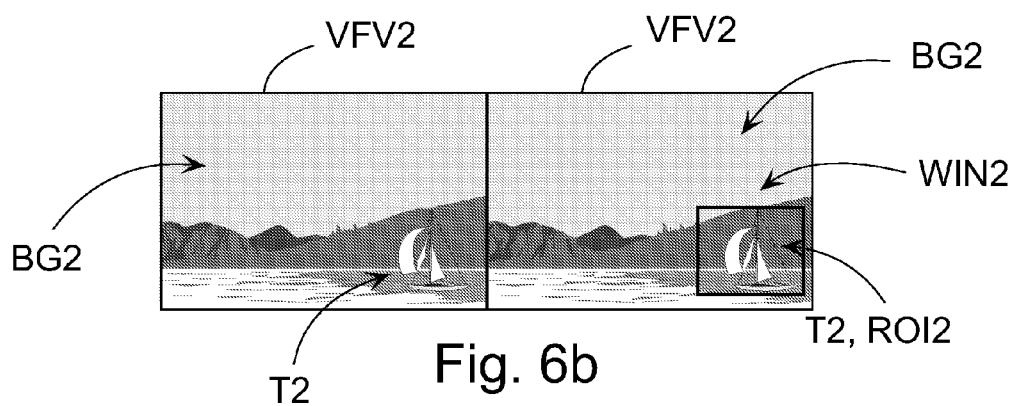

The ROI identification process (stage 202 in FIG. 2) starts 501 with displaying the image/frame of interest. Generally speaking, on the display 18 of the device 10 the imaging scene/view is displayed, including the target i.e. the ROI. FIGS. 6a and 6b present examples of the viewfinder views VFV1, VFV2 (left side images).

In stage 502 the user is asked to pick an object T1, T2 from the image VFV1, VFV2. According to one embodiment the user can itself pick an object T1, T2 of interest in the viewfinder video frame VFV1, VFV2 that is currently viewed on the display 18 when the camera sensor 11 of the device 10 is aimed towards the desired scene BG1, T1, BG2, T2. On behalf of the user the application in the camera device 10 may also pick that object T1, T2 for him. In order to perform this, a segmentation technique may be applied, for example.

In connection with the picking stage 502 the user is asked to define the target T1, T2. In order to define the target T1, T2 the user may draw a window or adjusts a rectangle WIN1, WIN2 around the target T1, T2 being in the frame VFV1, VFV2 displayed on the display 18 in order to enclose the object of interest. The viewfinder views VFV1, VFV2 relating to this window WIN1, WIN2 definition step 502 is presented in the right side of the FIGS. 6a and 6b. In the example of FIG.

6a the target T1 i.e. the region of the interest is the walking couple and the sea scenery represents the background BG1. In the example of FIG. 6b the target T2 is the boat and the mountain/water landscape represents the background BG2.

The drawing of the window WIN1, WIN2 can be done on a touch screen if it is part of the system, otherwise UI displays a rectangle and the user can move it and resize it using some specified cursor keys of the keypad 19, for example. The object T1, T2 picked in stage 502 is named also a region of interest (ROI1, ROI2).

The coordinates of the selected rectangle or window WIN1, WIN2 are determined in stage 503 and in stage 504 they are read and passed from the UI to the identification algorithm. The window coordinates may include, for example, top-left and bottom-right corners of the defined window WIN1, WIN2.

In the identification algorithm stages 505 the statistics of the colours in connection with the defined window WIN1, WIN2 are analyzed and as a result the object T1, T2 inside the defined window WIN1, WIN2 is automatically identified. In the picking stage 502 the user must leave some safe zone around the target T1, T2 when defining the window WIN1, WIN2.

Figure 7A:
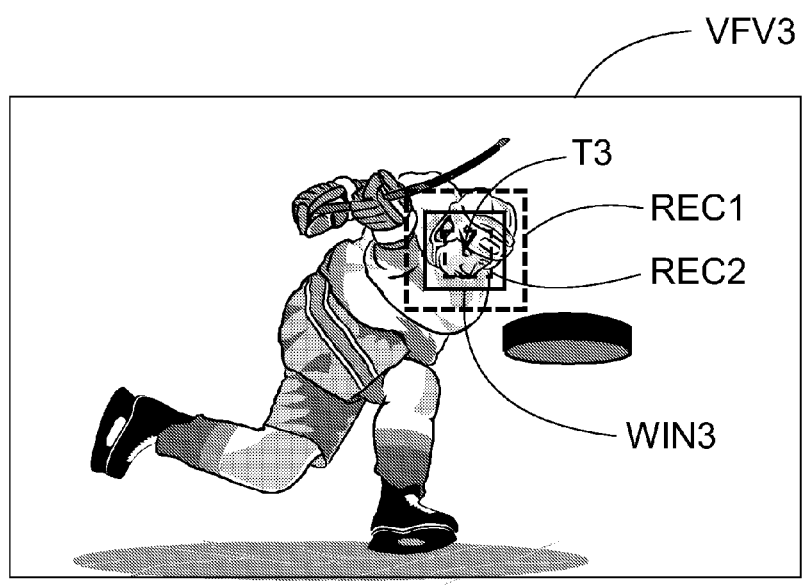
FIG. 7a shows an example of the color-content based distinction of target from background using the color histograms corresponding to exocentric rectangular regions.

FIG. 7a describes the principle of the identification algorithm in a more detailed manner. There the defined area in the viewfinder frame VFV3 i.e. the target T3 is the face of the ice-hockey player. In the method stage 506 two other rectangles REC1, REC2 are constructed, which are close to the defined window WIN3 (including the target T3). Rectangles REC1, REC2 may be constructed by the algorithm itself (code means 31.17). One rectangle REC2 is inside the window WIN3 defined by the user and the other rectangle REC1 is outside of the defined window WIN3. The spacing between the edges of constructed rectangles REC1, REC2 is small with respect to their widths and lengths.

At stage 507 the intensity histograms are computed for each rectangle REC1, REC2 and for the defined window WIN3. These histograms describe the corresponding luminance content of the concerned rectangle. Let h0, h1 and h2 be these histograms associated, respectively, with selected area WIN3, outside and inside rectangles REC1, REC2.

At stage 508 histogram-based matching, for each pixel within the selected window WIN3, is performed (code means 31.16). The matching is followed by a binary dilation in order to uniformly expand the size of the ROI in controlled and well-defined manner (code means 31.18). Binary dilation may be performed with neighbouring pixels, for example, 3×3 block. Other block sizes may also be applied depending on, for example, the frame resolution. The purpose of the binary dilation process is to fill in any small "holes" in the mask due to pixels (in ROI) but estimated in background based on their color content. Generally speaking, this is a unifying process in which the neighborhood of the current pixel is harmonized. However, the binary dilation filter should not be too large in order not to expand the ROI region in background. This kind of application can applied simultaneously with pixel matching in order to achieve a significant reduction in complexity.

Figure 7B:
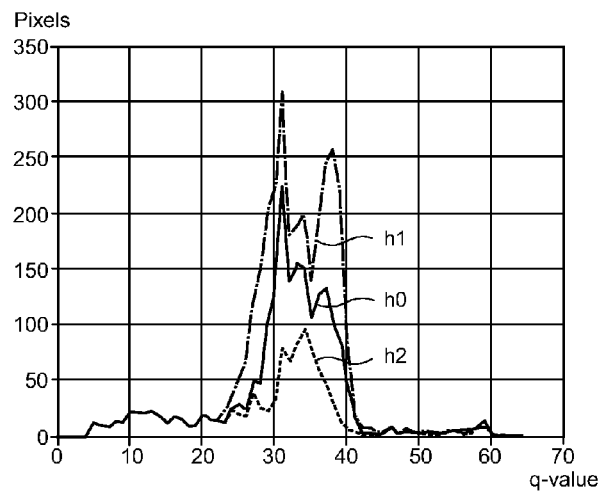
FIG. 7b shows an example of the color histograms of the exocentric rectangular regions.

As a sub-stage 509 of main stage 508 the next pixel, within the selected area WIN3, is taken. In stage 510 the pixel luminance value is quantized with the histogram bin size resulting in the quantized intensity 'q_value'. FIG. 7b presents an example of the color histograms h0-h2 of exocentric rectangular regions WIN3, REC1, REC2.

In stage 511 the status of each pixel in the selected area WIN3 is determined. In order to find out whether a pixel belongs to the target T3 or not the ratios representing the relative recurrence, i.e. with respect the pixel count in WIN3, of the pixel colour both inside REC2 and within the layer between WIN3 and REC1 are computed. The ratios are equal to the number of pixels, (=counts) per the corresponding q_value, in each region divided by the number of pixels, per the same q_value, in WIN3:

$$r1 = \frac{h1[q\_value] - h0[q\_value]}{h0[q\_value]}$$

$$r2 = \frac{h2[q\_value]}{h0[q\_value]}$$

Figure 8A:
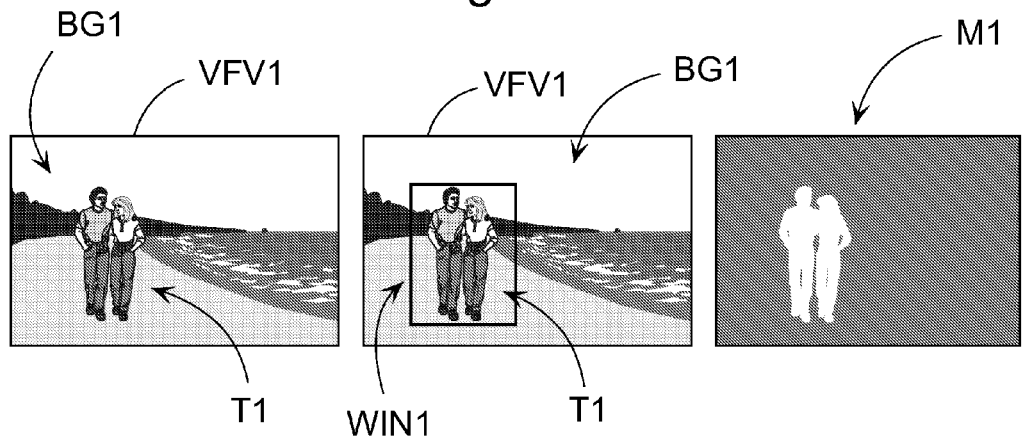
FIGS. 8a and 8b show examples of the produced ROI masks of embodiments of FIGS. 6a and 6b.
Figure 8B:
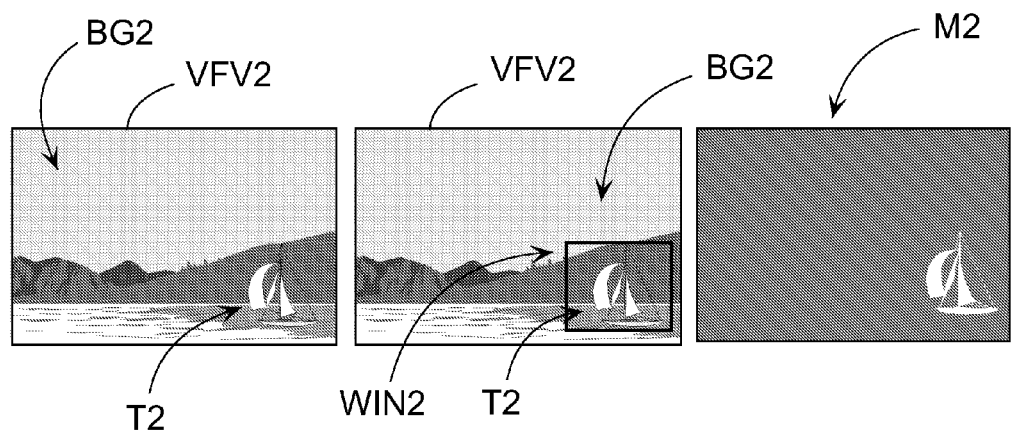
Figure 9:
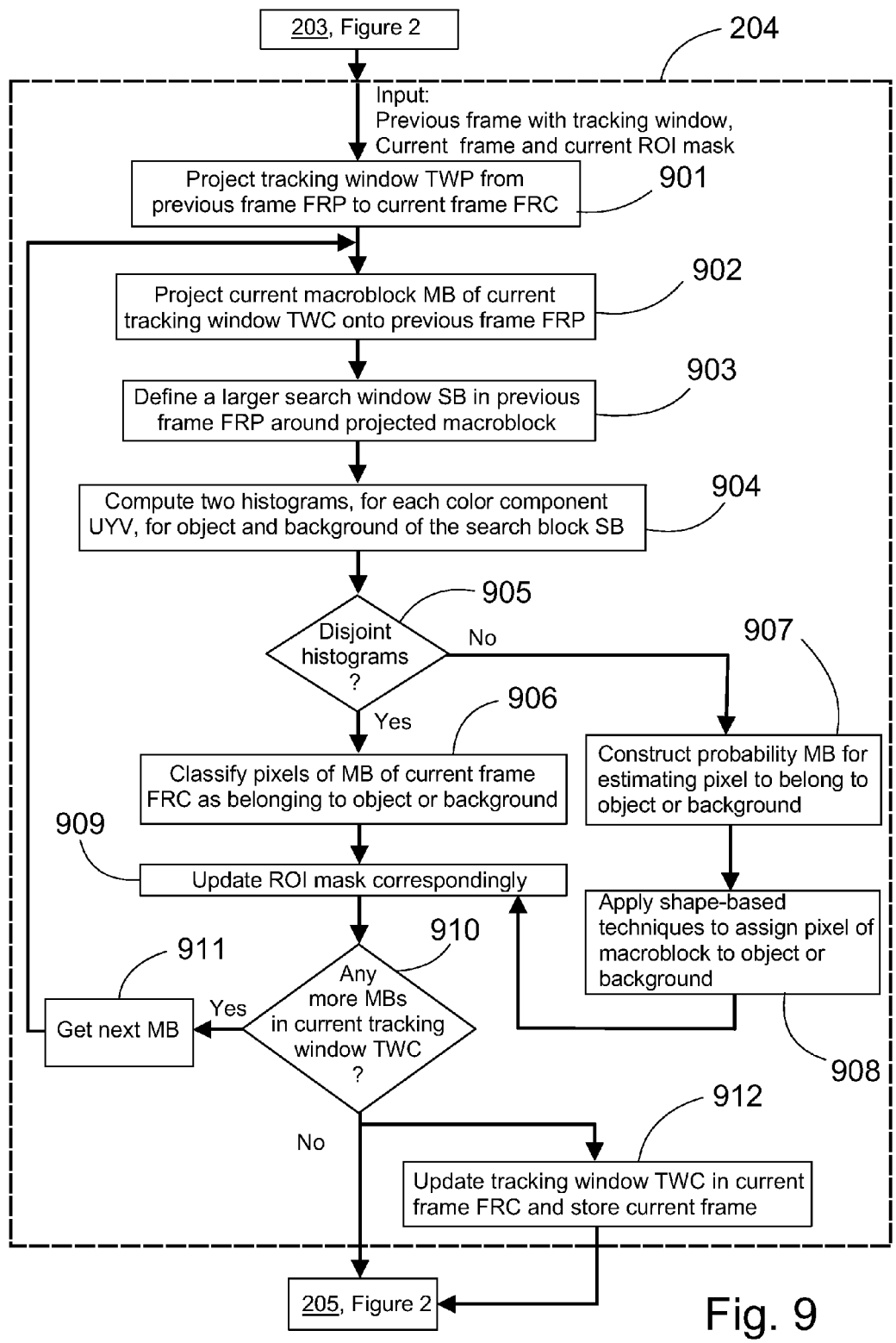
FIG. 9 shows an example of the ROI tracking process according to the invention as a flowchart.

In stage 512 is performed a test. If the calculated ratio r1<threshold1 and the ratio r2>threshold2 then a step to stage 513 is made. The value of threshold2 is to be chosen within the range [0.5, 0.7] whereas a good choice of threshold1 would be within [0.05, 0.25]. The threshold values may also be chosen based on the ratios of the areas of REC2 and the region between WIN1 and REC1 divided by the area of WIN3. For the sake of a simple and efficient implementation of the omni-directional dilation method, the current pixel of the defined area WIN3 and all its 8 nearest neighbours are considered to be part of the ROI, i.e. the target T3, if both thresholding tests are satisfied. The ROI-mask (M1, M2 in FIGS. 8a, 8b, if considering the imaging cases presented in FIGS. 6a and 6b) is initialized accordingly at the current pixel and its neighbours. These steps, starting at stage 509 are repeated for the next pixel and this loop is continued until each of the pixels of the defined area WIN3 are tested.

If one, or both, of the conditions of the test of stage 512 fails then the current pixel of the defined area WIN3 is considered not to be the part of the ROI i.e. the target T3. It is decided to belong to background and no further actions are then required. A step back to stage 509 is taken if there are still untested pixels in the area WIN3.

When the stage totality 508 is entirely performed, then a step to stage 514 is taken. There it is possible to perform one or more possible refinement steps. The refinement steps may apply, for example, morphological filters. These may be used to guarantee regularity in the object shape by eliminating any irregularities, such as, holes, small isolated areas, etc.

When all ROI identification stages are performed then in stage 515 the produced ROI mask is passed to an algorithm that tracks the moving or not moving ROI in the video capturing process (stage 204). Before that, the user is informed in the UI that the automatic identification of the ROI has been performed and now it is possible to start the actual video recording process. The ROI masks M1, M2 of the example cases of FIGS. 6a and 6b have been presented in the right side of the FIGS. 8a and 8b. In these mask M1, M2 the target T1, T2 is indicated as white and the background BG1, BG2 is indicated as black.

The ROI identification solution described just above takes into account a very important factor. That is the simplification of the user interaction in order to keep any related application attractive and pleasant. Specifically, the user draws (on touch screen) or adjusts (using specified cursor keys) a rectangle WIN1-WIN3 containing the target T1-T3. The algorithm reads the window WIN1-WIN3 coordinates from the UI and automatically identifies the ROI in the manner just described above. Besides the simplicity of the user interaction, the algorithm is of low computational complexity as it is based on color-histogram processing within the selected window WIN1-WIN3 and simple morphological filters. Furthermore, the output of the identification is a generated mask M1, M2 for the ROI, which is easy to use in any ROI tracking approach during actual recording process. All these features make such method suitable for mobile device applications.

This described method above can be implemented as the initialization of ROI tracker 16 which is intended to be described as a one example next in the below.

Region-of-Interest Tracking (Stage 204):

Tracking of the region-of-interest is described next. It is the software module that makes use of the results of identification stage 202 described just above. The device 10 may have functionality concerning this ROI tracking 16. This may also be implemented by the processor CPU and program codes 31.2, 31.7-31.15 executed by the processor CPU. A tracked object from the recorded video can then be used for improved and customized auto-focus 12 of the camera 10, for example.

Next an example of the tracking procedure 204 is presented. The described process provides the capability to provide tracking robustness with a fairly simple algorithm.

Generally speaking, the tracking process according to the invention can be understood as a two-stage approach. The first step applies localized colour histograms. The second phase is applied only if the target i.e. the region-of-interest ROI and the neighbouring background regions, within a local area, share some colour content. In that case, simple shape matching is performed (code means 31.13).

The goal of the tracking stage 204 is to define a ROI mask M5 describing the current location and shape of the target T4, T5 in each frame FRC, FRP, FR and output a tracking window TWP, TWC, TW containing the target T4, T5. The design (i.e. the size and place, for example) of the tracking window TWP, TWC, TW takes into account the motion of the target T4, T5 so that in the next future frame the target T4, T5 is expected to stay within the window TWP, TWC, TW, i.e. keep a background BG4, BG5 margin on the sides of the target T4, T5.

The main stage 204, described in details below, assumes that the user defines a window or area presented in FIGS. 6a and 6b, or a region-of-interest ROI, around the targeted object T4, T5 to give an idea of the location of the region-of-interest. Otherwise, there could be many potential objects in the video frame to choose from, and without a-priori information, it would be impossible to target the correct one.

Once the region-of-interest (ROI) has been defined, the next task is to identify the object-of-interest within the defined window. Various algorithms can be used to segment the object within the ROI and separate it form the background. The main stage 202 and the more detailed embodiment presented in FIG. 5 performs these duties. Once the object is detected, it is identified by a mask (stage 515), which is fed to the tracking process 204 described next. The task of the tracking process 204 is to update the mask M5 and the tracking window TWC, TWP, TW in each frame FRC, FRP, FR and provide correct information about the object. Using tracking results the stages 205-212 may then be successfully performed in determining the spatial position of the ROI for the auto-focus unit 12.

Figures 10A, 10B:
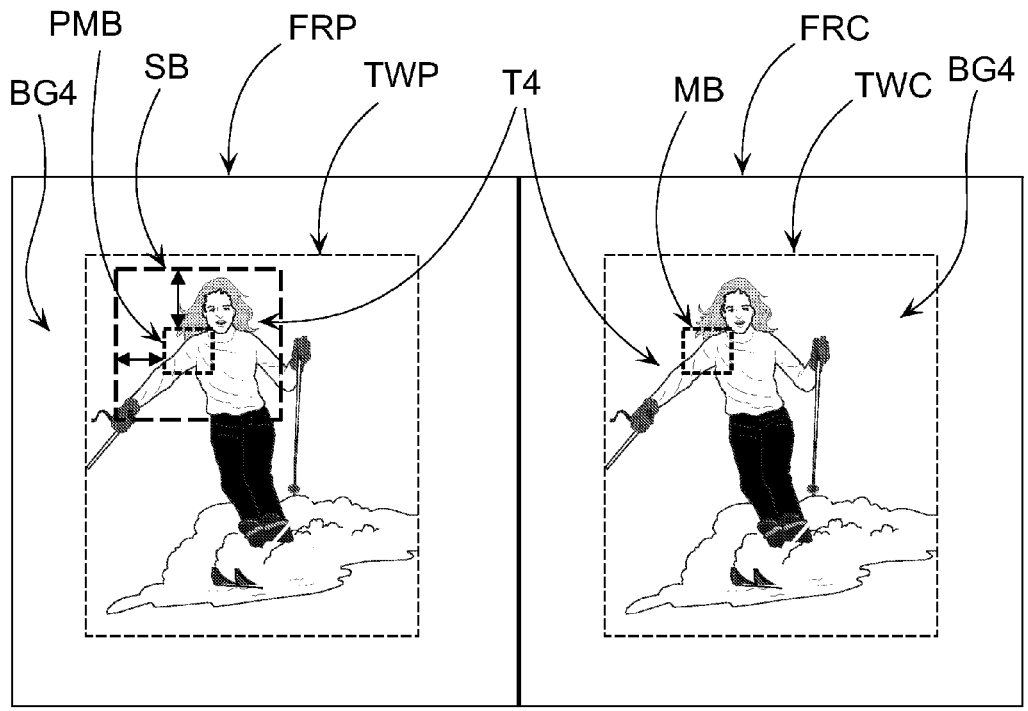
FIGS. 10a, 10b show principle examples of the generation of the block-wise histograms, for the background and the ROI, FIG. 11 show examples of the shape of the mask block and probability macroblocks in connection with the shape matching procedure.
Figure 12A:
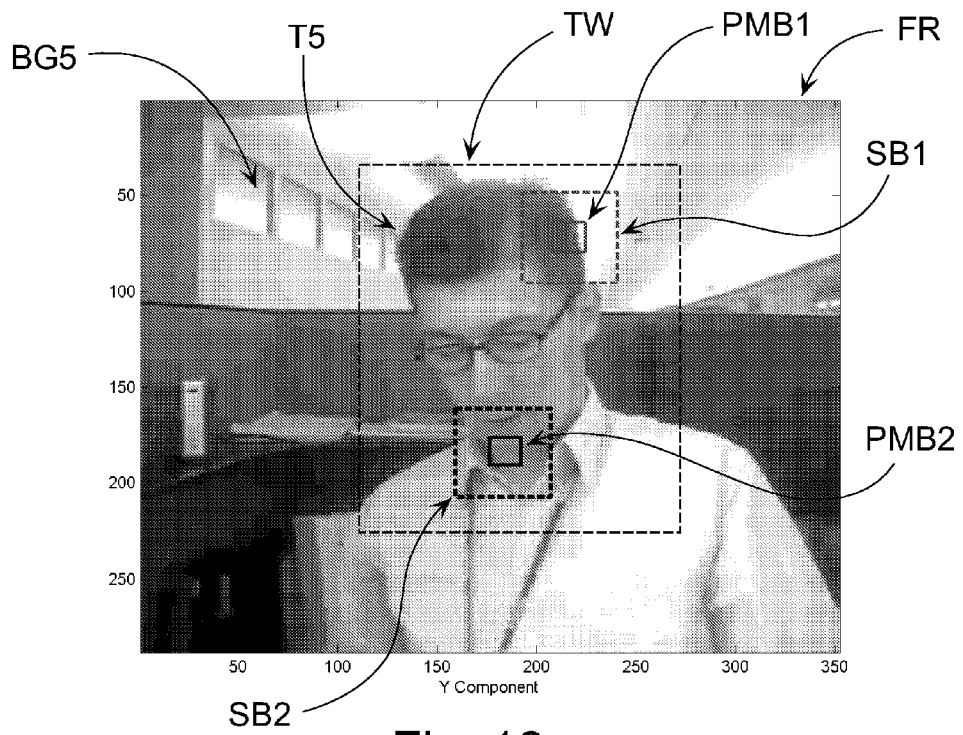
FIGS. 12a, 12b show a mask of the Y-component and the ROI mask as an example in the real imaging situation

Considering FIGS. 10a, 10b and 12a, the skiing woman represents the target T4 in FIGS. 10a and 10b and the man in the office is the target T5 in FIG. 12a whereas the office scenery is the background BG5. The input data to the ROI tracking stage 204, at each frame, includes the previous tracked frame FRP, FR (i.e. the image content of the previous frame), the image content of the current frame FRC and also the ROI mask M5 of the previous frame FR. The ROI mask M5 is required in order to decide which parts of the previous frame FR represent background portions BG5 and which parts of the previous frame FR represent the target T5. Thus, some frames must already be produced with the camera sensor 11 (in stages 203, 203') before it is possible to start the main stage 204. When the recording process 203, 203' is just started i.e. the first cycle of the ROI tracking process 204 is in question, then the ROI mask identified in stage 202 is passed to the tracking algorithm. These both frames FRP and FRC and the latest ROI mask are stored to the memory MEM of the device 10. FIG. 10a presents a previous frame FRP and FIG. 10b shows the current frame FRC. In general, frames FRP and FRC are not necessarily sequential as frame skipping might be applied so that tracking can keep up with the recording speed.

In stage 901 the tracking window TWC is projected on the current frame FRC. The tracking window TWC is an area defined by the tracking algorithm and whose corner coordinates are updated dated at each cycle of the loop 204. If the current loop of the tracking is the first, then the tracking window TWC may be generated based on the identified (initial) ROI mask produced in the stage 202.

In the invention the current tracking window TWC is divided into, i.e. macroblocks MB. Macroblock MB is a geometric entity representing a set of pixels belonging to an N-by-N square (for example, 8×8 or 16×16, for example).

Generally speaking, the colour histogram technique used in the first stage is applied on macro-block-wise. It provides a good tracking robustness. In the next stage 902 the current macroblock MB inside the current projected tracking window TWC of the current frame FRC and presented in dashed short lines is projected on the previous frame FRP (small block PMB in dashed in the previous frame FRP). The projecting measure means in this connection that in the previous frame FRP is defined an area PMB which location and size corresponds its location and size in the current frame FRC.

In stage 903 is defined a search block SB presented dashed line in the previous frame FRP (in FIG. 10a). This search block SB surrounds the projected macroblock PMB that was just projected there. The search block SB defined in the previous frame FRP represents the search area for the current macroblock MB. The search block SB is its own block for the each of the projected macroblocks PMB of the current tracking window TWC which are go through one by one by the algorithm (code means 31.8).

The search block SB is constructed by enlarging the projected macroblock PMB in the previous frame FRP in each direction, as indicated by the double-headed arrows (code means 31.9). The distance of the enlarging may be a constant and that may be equal to the estimated motion range (code means 31.10). Such a distance may represent the maximum possible motion range. It can be estimated adaptively based on previous values or can be set to a constant that is large enough to be an upper bound for displacements within video sequences (e.g. 16 or 32). Its purpose is to ensure that the best match for the current macroblock MB is inside this search block SB defined for it.

Next the imaging case presented in FIG. 12a is described a little bit detailed. It is an example representing the real imaging situation. Actually, FIG. 12a presents the previous image frame FR and, more particular, its Y-component (if the applied color space is YUV). However, this component-wise frame FR may now also be understood in this connection as the actual image frame that is observed. The content of the other components (U and V) would be very blurred (even if they would be printed by using the laser printing technology not to speak of offset printing used in patent publications). Due to this reason these other (U and V) component frames are not presented in this context.

In FIG. 12a there are shown two projected macroblocks PMB1, PMB2 which have their own search blocks SB1, SB2 in the tracking window TW. It should be understood that though the blocks PMB1, PMB2, SB1, SB2 are here presented now in this same figure, in reality they are tracked in order by the tracking loop stage 204. Thus, one macroblock is under tracking process during the current tracking loop 204.

In stage 904 are computed two histograms (code means 31.11). These are background and ROI histograms. The histograms are computed only for the pixels inside the search block SB, SB1, SB2, in the previous frame FRP, FR surrounding the projected macro-block PMB, PMB1, PMB2. This means that the pixels of the previous frame FRP, FR which are inside the area of the projected macroblock PMB, PMB1, PMB2 of the previous frame FRP, FR are also taken into account when constructing ROI and background histograms of the search block SB, SB1, SB2 of the previous frame FRP, FR.

The histograms represent the color content of the target and background portions inside the large dashed line block SB, SB1, SB2. Using these background and target histograms, it is possible to detect a possible common colour between the two regions (target and background) whereas processing macroblock-wise results in an efficient handling of shape flexibility. In this way, the generated histograms provide a description of localized color distributions of ROI and background.

More particular, there are constructed histograms for two areas which are the ROI area and the background area. For each of the area are constructed the Y, U and V componentwise histograms. Of course, other color spaces will also become into question, YUV is only used as an example in this connection. An example of these histograms in the case of the real imaging situation shown in FIG. 12a are presented in upper parts of FIGS. 13a-13f. These histograms describe the colour contents of the target and background regions inside the search block SB1, SB2 defined in previous step.

Figure 12B:
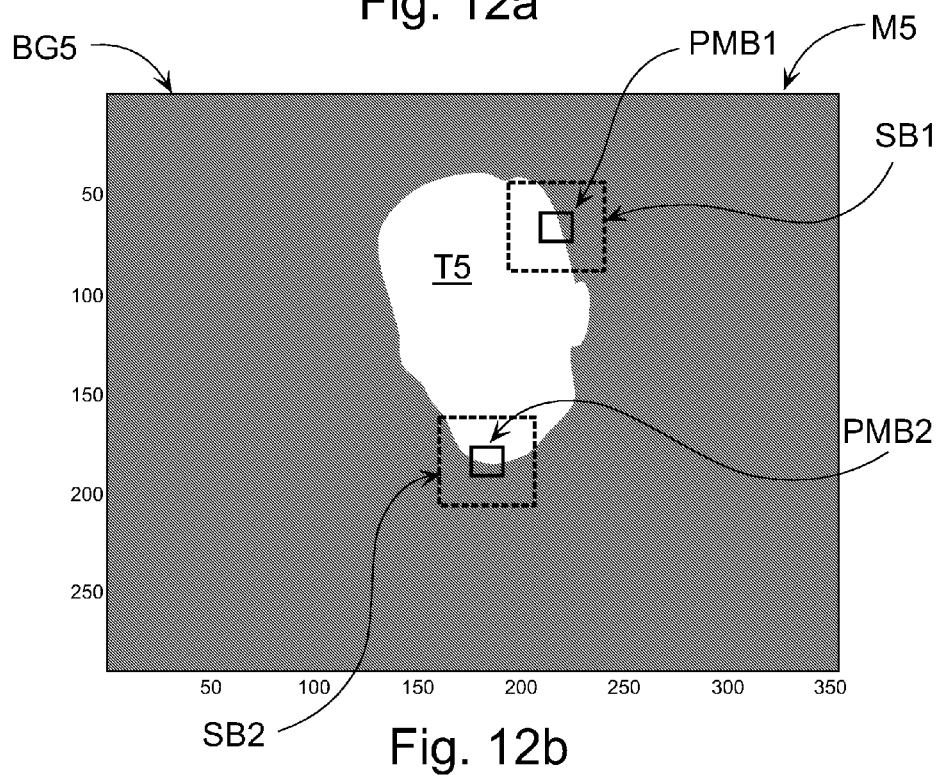

According to this there are generated in the every cycle of the loop six histograms. Three of the histograms H1-H3, H4-H6 are generated for the target region T5 i.e. for the ROI of the search area SB1, SB2 of the previous frame FR (=Y, U and V) and three of the histograms H1'-H3', H4'-H6' are generated for the background region BG5 of the search area SB1, SB2 of the previous frame FR (=Y, U and V). Now the histograms H1-H3 are YUV histograms of the case one target region T5 i.e. the component-wise histograms of the search block SB1 of the FIG. 12a. Correspondingly, the histograms H4-H6 are YUV histograms of the case two target region T5 i.e. the component wise histograms of the search block SB2 of the FIG. 13a. In the same manner the histograms H1'-H3' are background portion BG5 of search block SB1 and histograms H4'-H6' are the background's SB2. The status of the each pixel of the search block SB1, SB2 (i.e. whether the pixel is a ROI pixel or a background pixel) is got from the ROI mask M5 presented in FIG. 12b that corresponds the previous image frame FR.

These six histograms may be constructed as follows. For every pixel in search block SB1, SB2 in previous frame FR including also the projected macroblock area PMB1, PMB2 of the previous frame FR is performed an analysis according to which:

(i) The corresponding Y, U and V values of each pixel inside the search block SB1, SB2 of the previous frame FR (where the ROI is already defined by applying the ROI mask M5) are divided by the corresponding histogram bin size in order to find to which bins in the color histograms H1-H6, H1'-H6' do these values correspond, (ii) If the current pixel of the search block SB1, SB2 of the previous frame FR is based on the ROI mask M5 discovered to be the background pixel, then the three background histograms H1'-H3', H4'-H6' are incremented in the appropriate bins computed in step (i), (iii) If the current pixel is of the search block SB1, SB2 of the previous frame FR is based on the ROI mask M5 discovered to be inside the ROI, i.e. part of the ROI in previous frame FR falls inside SB1, SB2 and the pixel is in that part of the ROI, then the three ROI histograms H1-H3, H4-H6 are incremented in the appropriate bins computed in step (i).

Now, each bin (i.e. X-axis) in ROI histograms H1-H6 represents the number of pixels (Y-axis), whose color values fall into a specific range, belong to the target region T5 in the search area SB1, SB2 of the previous frame FR. Similarly, background BG5 histograms H1'-H6' represent number of pixels, within the search block SB1, SB2 of the previous frame FR, that are discovered to be background pixels based on the ROI mask M5.

On the basis of these color histograms H1-H6, H1'-H6' it is possible to generate a probability histograms P1-P6. These indicate the probability of each pixel having certain color being in the ROI. On the basis of the probability histograms P1-P6 it is also possible to generate a probability macro-block Pmb1, Pmb2 for the color content of the current macroblock MB of the current frame FRC (FIGS. 11b and 11c).

The above means that each pixel in a given macroblock MB, MB1, MB2 of the current frame FR, FRC is assigned a probability of being in the region-of-interest (ROI, T4, T5) based on the computed histograms of the background and the target regions in a corresponding search block SB, SB1, SB2 in the previous frame FRP, FR.

More particular, now it is the question of the probability of a given pixel of the given macroblock of the current frame, with color values Y(i,j), U(i,j) and V(i,j), being in the ROI or in the background. There are defined Y, U and V probabilities Py, Pu and Pv. For each bin, for example, with index k, $$Py(k)=ROI\_Y\_hist(k)/(ROI\_Y\_hist(k)+Background\_Y\_hist(k)),$$

$$Pu(k)=ROI\_U\_hist(k)/(ROI\_U\_hist(k)+Background\_U\_hist(k)),$$

$$Pv(k)=ROI\_V\_hist(k)/(ROI\_V\_hist(k)+Background\_V\_hist(k)).$$

The equations presented above means that the sum of pixels with similar values belonging to the ROI is divided by the number of the pixels with similar values in the search block SB1 in previous frame FR. This means that the probabilities are computed based on color distributions in search block of previous frame. The computed probabilities are then applied to the current macroblock in current frame. The probabilities indicate the status of the pixels of the current macroblock (MB) i.e. whether a given pixel of the current macroblock is more likely a ROI pixel or a background pixel (code means 31.12).

In FIGS. 11b and 11c are presented two hypothetical examples of the probability macroblocks Pmb1, Pmb2 for shape matching. These may be imagined to relate to the imaging case presented in FIGS. 10a and 10b. In FIG. 11a is presented a hypothetical ROI mask of the search block SB in which is projected i.e. defined a macroblock PMB. In FIGS. 13a-13f are also presented correspond probability histograms P1-P6 which relate to the real imaging case presented in FIG. 12a (YUV color components of search blocks SB1, SB2).

In stage 905 is performed an examination relating to the colour content differences between the object and background of the search block area SB1, SB2. If histograms for at least one of the components Y, U, V are disjoint, i.e. for each bin either ROI or background histogram value is equal to zero, a step to stage 906 is then performed. In stage 906 all pixels of the current macro-block MB1, MB2 in the current frame FRC corresponding to that bin are all assigned as ROI pixels or background pixels depending on the color of each pixel. More general, the here the statuses of the pixels of the macroblock are determined. This means that there may be both ROI pixels and/or background pixels in the macroblock. The ROI and background histograms for one of the color components are said to be disjoint if for every bin either the ROI histogram or background ground histogram is empty. On the other words, if there are pixels on the same bin in the histograms of both areas, then the disjoint condition is not valid. This basically means that for that particular color range, all pixels of the macroblock of the current frame are in ROI or all pixels are in background. This implies that for each pixel it is clear whether it belongs to the target or to the background and therefore no further processing is required in this case.

Figures 13E, 13F:
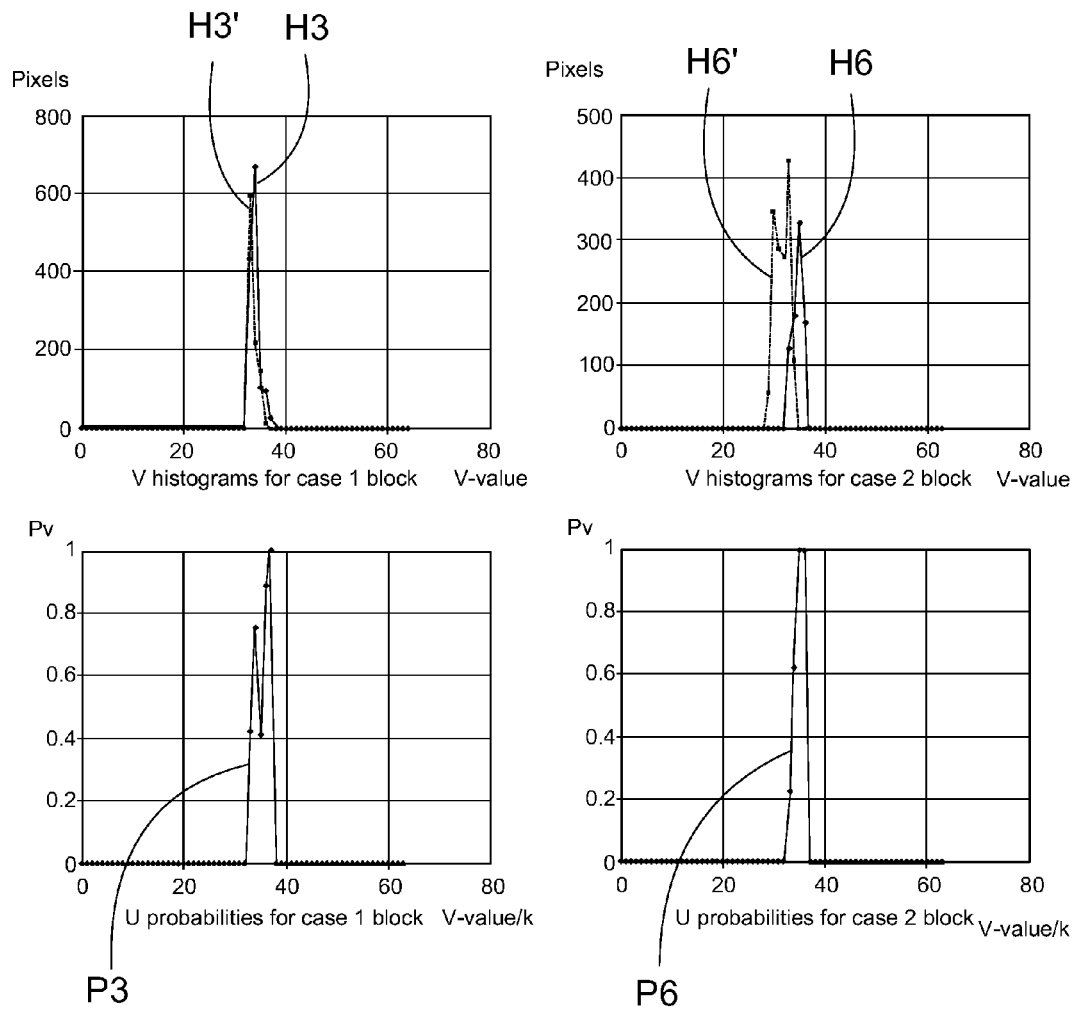

In the example of FIG. 12a this disjoint condition is valid for the case one which histograms are presented in FIGS. 13a, 13c, 13e. There one can easily see that in the Y-histogram H1, H1' the disjoint condition is in force in certain bin range (about 25-45). Correspondingly, in the probability histogram there are only values 1 and 0 (i.e. not any intermediate values between 1 and 0 which will indicate that there are common colors for the compared ROI and background areas).

Figure 11:
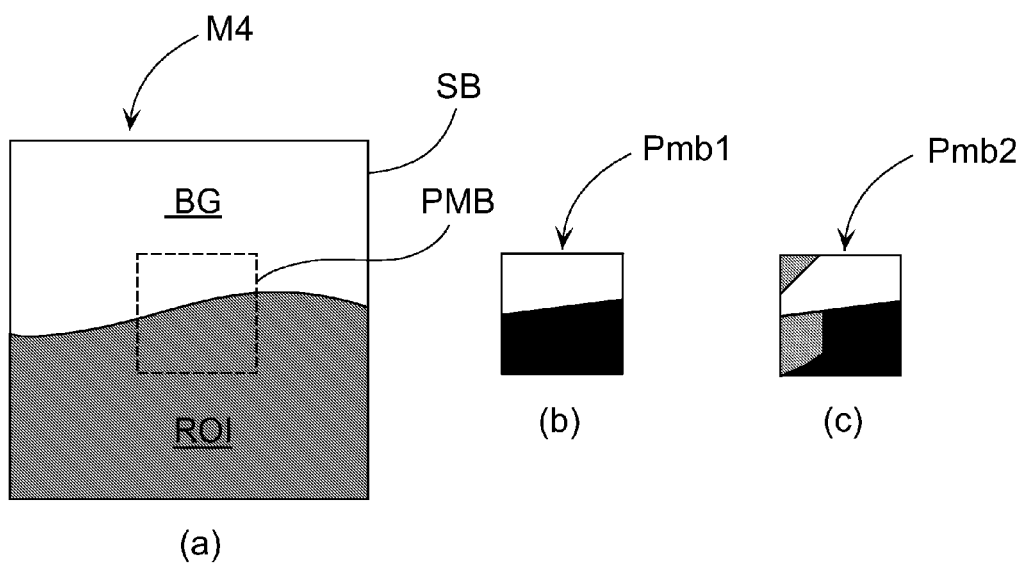

In the case explained above where the colours of the target and the neighbouring background regions are exclusive, i.e. corresponding histograms have zero intersection, probabilities will be ones and zeros. In FIG. 11, for example, the case b indicates this kind of situation. There the black indicates probability 1 and white implies probability 0. The above also means that the current mask is updated as stage 909 based on the colour histograms of the current macroblock MB1, MB2 and any other measures, such as, for example, shape matching is not required because the situation is so clear. The next step 910 is to check if there are any unmatched macroblocks left in the tracking window TWC of the current frame FRC and if there are then get the next macro-block in stage 911 and get back to stage 902. The procedure is performed for each macro-block inside the projected tracking window TWC of the previous frame FRP, FR.

However, if in stage 905 is detected that all histograms of the components U, Y, V between the regions is congruent, then a step to stage 907 is performed. In stage 907 is constructed a probability macro-block (if that was not constructed already in connection with analysing disjoint/congruent condition). Congruence means in this connection that the ROI and the background regions, inside the large block SB1, SB2 in previous frame FR share some colors in the case of each component YUV and due to this reason the nature of the macroblock is not so clear. Due to the congruence the probability macroblock (FIG. 11c) and all probability histograms P4-P6 will have values less than 1 and more than 0 (at least one intermediate value is enough to indicate congruence). In the probability macroblock Pmb2 each intermediate color between black and white and also in the probability histograms P4-P6 each entry (Y-axis) represents the probability Pu, Py, Pv of the corresponding pixel value (X-axis) being in the target.

These second stages 907 and 908 of the algorithm presented above are thus executed only when there is colour similarity between the target and background regions inside the search block SB2. After stage 907 may be applied the shape-based technique. Shape matching may be performed in the probability domain. In the stage 908 the probability macro-block Pmb2 of the current frame FRC is matched to a mask region within the search block SB of the previous frame FRP. This is presented in FIGS. 11a and 11c.

ROI mask M5 is a binary picture representation of the shape of the ROI indicated by a value 1 if the pixel is an ROI (=target) and a value 0 if it is in background. In addition to the shape-based matching the ROI mask M5 is also applied when deciding if the pixel of the search block SB belongs to ROI or background in the previous frame. The shape-based matching of the ROI region performed in stage 908 is applied within a "shape representation" i.e. mask with values equal to 0 or 1 and a probability macro-block with values between 0 and 1. At the end of this stage, false alarms can be eliminated and a decision on whether or not a pixel inside the macro-block of the current frame is in the background or in the target.

Owing to the shape based matching is achieved elimination of false alarms. According to one embodiment the shape-based matching of the ROI may be performed by minimizing the sum of absolute difference (SAD). This is performed between the probability values of the current macroblock (the probability block) and values of candidate blocks in ROI mask (code means 31.14, 31.15).

After finding the probabilities of each pixel in the current macroblock in stage 907, the next step is to find the best block in the ROI mask on stage 908. So the algorithm makes a search in the ROI mask to find the macroblock sized area that is the closest, i.e. has least sum of absolute difference, to the current probability macroblock. In other words, if the current macroblock has probabilities Pmb(i,j) and ROI mask has values M(i,j) then it is performed a looking procedure for a block in the mask that has the minimum:

$$\sum_{(i,j)} |Pmb(i,j) - M(i-k1, j-k2)|$$

The indexes (i,j) are going through the values of the current block. The parameters k1 and k2 indicate the displacements of the mask block when performing the search. These displacements are performed in each direction pixel by pixel i.e. the matched macroblock is fitted to each location of the ROI mask area.

When the best match has been found, then a step to stage 909 is performed in which the mask is updated. After steps 910, 911 a loop is again initiated for the next macroblock of the current frame. If all macroblocks of the current frame have already been went through, then a step to main stage 205 is performed with the determined ROI mask. Also, the current tracking window is stored in order to be used that in the next loop cycle.

The real time tracking algorithm described just above is very robust to all variabilities already described in prior art section. At the same time it is a computationally effective and memory-efficient technique so that it can be adopted in the current and upcoming electronic devices generating video sequences. It provides a capability to detect and handle colour similarity between target and background and robustness to shape deformation and partial occlusion. Generally speaking, it provides means for performing shape matching, i.e. matching in the probability domain.

The algorithm according to the invention performs the matching without using any detailed features. This can act as an advantage in that it provides robustness to flexibility in position and shape.

The auto-focus 12 according to the invention is based on, for example, the passive scheme. It means that there is applied the image data produced by the sensor 11. In that the auto-focus unit 12 relies mainly on the sharpness (by computing edges on horizontal and vertical direction) and by using the contrast info. Only areas of the image may be considered for this analysis, for example. Based on the results the actuating motor 13 of the lens system updates the position of one or more lens 14. The method according to the invention may be used in that kind of auto-focus scheme by including the ROI identifier 15 and tracker 16. Of course, the invention itself doesn't depend on the used auto-focus scheme but the invention may also be implemented in connection with different kind of auto-focus schemes. The tracker 16 according to the invention will indicate the coordinates of the areas to analyze in the auto-focus unit 12. This is performed via the spatial positioning unit of the ROI 17. It determines these coordinates in stages 205 and 206. The tracker 16 will also add a third dimension on the displacement of the object along the Z-axis. Owing to this spatial handling without any pre-estimation of the location of the ROI in the frame a more robust auto-focus will be achieved and also the moving targets are kept in good focus.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. An electronic device equipped with a video imaging process capability, comprising:
   a camera unit configured to produce image frames from an imaging view which includes a region-of-interest ROI,
   an adjustable optics configured in connection with the camera unit in order to focus the ROI on the camera unit,
   an identifier unit in order to identify a ROI from the image frame,
   a tracking unit in order to track the ROI from the image frames during the video imaging process, wherein the tracking unit is configured to perform the ROI tracking on macroblock basis in which ROI tracking is configured to be decided whether the pixels of the current macroblock of the current image frame belong to a ROI region or to a background region and the decision is configured to be based on the color content of the previous image frame in which the ROI region is already known, and the tracking unit is further configured to:
      define the ROI region and the background region in a search area of the previous image frame which definitions are configured to be based on a ROI mask of the previous image frame,
      form color histograms of the ROI region and the background region of the search area,
      analyze the color histograms of the ROI region and background region and on the basis of the results of the analysis,
      determine the status of the pixels of the current macroblock of the current image frame whether they belong to the ROI region or to the background region, and
      update the current ROI mask based on this determination,
   an auto-focus unit configured to analyze the ROI on the basis of the tracking results provided by the tracking unit in order to adjust the optics and the device being configured to
      determine the spatial position of the ROI along the Z-axis in order to detect the movement of the ROI in depth of the imaging view,
      determine the spatial position of the ROI from the produced image frames,
      determine the Z-axis position of the ROI from a change in the size of the ROI between produced consecutive image frames, and
      adjust the optics on the basis of the determination in an established manner.

2. An electronic device according to claim 1, wherein the spatial position is a plane position of the ROI in the image frame.

3. An electronic device according to claim 1, wherein the tracking unit is configured to project each macroblock of the tracking window of the current image frame into the previous image frame in which for each of the macroblocks a search area is arranged to be defined in order to determine the color content of the ROI region and background region.

4. An electronic device according to claim 3, wherein the search area is configured to be constructed by enlarging the projected macroblock in the previous image frame in each direction in order to ensure that the best match for the current macroblock is inside the search area defined for it.

5. An electronic device according to claim 4, wherein the search area is configured to be constructed by enlarging the projected macroblock in the previous image frame in each direction by a distance equal to the estimated motion range.

6. An electronic device according to claim 1, wherein the analysis of the color histograms of the ROI region and background region is configured to be performed on the basis of the probabilities, which state if the pixel of the current macroblock is more a ROI pixel or a background pixel.

7. An electronic device according to claim 1, wherein if the ROI region inside the search area of the previous image frame is discovered to share some color content with the background region of the search area of the previous image frame, the tracking unit is configured to perform a shape matching procedure in order to find the best location for the current macroblock in the search area in the previous ROI mask.

8. An electronic device according to claim 7, wherein the tracking unit is configured to apply SAD method (Sum of Absolute Difference) in the shape matching procedure.

9. An electronic device according to claim 8, wherein the SAD method is configured to be performed on a probability domain in which the best match is configured to be determined for the current macroblock in the search area defined for that.

10. An electronic device according to claim 1, wherein the identifier unit is configured to generate the ROI mask on the basis of the statistics of the color-content in the middle and around of the defined area including the ROI.

11. An electronic device according to claim 10, wherein the identifier unit is configured to generate search areas inside and around the defined area and to analyze the local color-content between these areas in order to decide whether the pixels of the defined area belong to target or not.

12. An electronic device according to claim 10, wherein the identifier unit is configured to perform histogram-based matching for each pixel within the defined area and a binary dilation process in order to unify the neighborhood of the pixel in the ROI mask.

13. A method comprising:
    producing image frames from an imaging view which image frames include a region-of-interest ROI,
    identifying a ROI from the image frame in order to perform ROI tracking process during the video imaging process, tracking the ROI from the image frames during the video imaging process wherein the ROI tracking is performed on macroblock basis in which is decided whether the pixels of the current macroblock of the current image frame belong to an ROI region or to a background region and the decision is based on the color content of the previous image frame in which the ROI region is already known, and tracking the ROI further comprises defining the ROI region and the background region in a search area of the previous image frame which definitions are based on a ROI mask of the previous image frame, forming color histograms of the ROI region and the background region of the search area, analyzing the color histograms of the ROI region and background region, determining, on the basis of the results of the analysis, the status of the pixels of the current macroblock of the current image frame whether they belong to the ROI region or to the background region, and updating the current ROI mask based on this determination, determining the spatial position of the ROI from the produced image frames along the Z-axis in order to detect the movement of the ROI in depth of the imaging view, determining the Z-axis position of the ROI from a change in the size of the ROI between produced consecutive image frames, providing the tracking results of the ROI for an auto-focus unit in order to adjust an optics, and adjusting the optics configured in connection with the camera unit in order to focus the ROI on the camera unit.

14. A method according to claim 13, wherein the spatial position is a plane position of the ROI in the image frame.

15. A method according to claim 13, wherein in the ROI tracking stage each macroblock of the tracking window of the current image frame is projected into the previous image frame in which for each of the macroblocks a search area is defined in order to determine the color content of the ROI region and background region.

16. A method according to claim 15, wherein the search area is constructed by enlarging the projected macroblock in the previous image frame in each direction in order to ensure that the best match for the current macroblock is inside the search area defined for it.

17. A method according to claim 16, wherein the search area is constructed by enlarging the projected macroblock in the previous image frame in each direction by a distance equal to the estimated motion range.

18. A method according to claim 13, wherein the analysis of the color histograms of the ROI region and background region is performed on the basis of the probabilities, which state if the pixel of the current macroblock is more a ROI pixel or a background pixel.

19. A method according to claim 13, wherein if the ROI region inside the search area of the previous image frame shares some color content with the background region of the search area of the previous image frame then a shape matching procedure is performed in order to find the best location for the current macroblock in the search area in the previous ROI mask.

20. A method according to claim 19, wherein in the ROI tracking stage SAD method (Sum of Absolute Difference) is applied in the shape matching procedure.

21. A method according to claim 20, wherein the SAD method is performed on a probability domain in which the best match is determined for the current macroblock in the search area defined for that.

22. A method according to claim 13, wherein in the ROI identifying stage the ROI mask is generated based on the statistics of the color-content in the middle and around the defined area including the ROI.

23. A method according to claim 22, wherein in the ROI identifying stage search areas are generated inside and around the defined area and the local color-content between these areas is analyzed in order to decide whether the pixels of the defined area belong to target or not.

24. A method according to claim 22, wherein in the ROI identifying stage a histogram-based matching is performed for each pixel within the defined area followed by a binary dilation process in order to unify the neighborhood of the pixel in the ROI mask.

25. A computer program product, stored on a non-transitory computer-readable memory medium and executable by a processor, for video imaging processing in order to provide region-of-interest ROI tracking results for an auto-focus unit which is configured to analyze the ROI on the basis of the tracking results in order to adjust optics configured in connection with a camera unit in order to focus the ROI on the camera unit, the computer program product comprising:

code means configured to identify the ROI from the image frame produced by the camera unit, code means configured to perform tracking of the ROI from the image frames during the video imaging process, wherein the code means is further configured to perform the ROI tracking on macroblock basis in which ROI tracking is configured to be decided whether pixels of the current macroblock of the current image frame belong to a ROI region or to a background region and the decision is configured to be based on the color content of the previous image frame in which the ROI region is already known, code means configured to define the ROI region and the background region in a search area of the previous image frame which definitions are configured to be based on a ROI mask of the previous image frame, form color histograms of the ROI region and the background region of the search area, analyze the color histograms of the ROI region and background region and on the basis of the results of the analysis, determine the status of the pixels of the current macroblock of the current image frame whether they belong to the ROI region or to the background region, and update the current ROI mask based on this determination, code means configured to determine the spatial position of the ROI along the Z-axis in order to detect the movement of the ROI in depth of the imaging view, code means configured to determine the spatial position of the ROI from the produced image frame, code means configured to determine the Z-axis position of the ROI from a change in the size of the ROI between the produced image frames, and code means for adjusting the optics on the basis of the determination in an established manner.

26. The computer program product according to claim 25, wherein the program code includes code means configured to determine a plane position of the ROI in the image frame as the said spatial position.

27. The computer program product according to claim 25, wherein the program code includes code means configured to project each macroblock of the tracking window of the current image frame into the previous image frame in which for each of the macroblocks a search area is configured to be defined in order to determine the color content of the ROI region and background region.

28. The computer program product according to claim 27, wherein the program code includes code means configured to construct the search area by enlarging the projected macroblock in the previous image frame in each direction in order to ensure that the best match for the current macroblock is inside the search area defined for it.

29. The computer program product according to claim 28, wherein the program code includes code means configured to construct the search area by enlarging the projected macroblock in the previous image frame in each direction by a distance equal to the estimated motion range.

30. The computer program product according to claim 25, wherein the program code includes code means configured to perform the analysis of the color histograms of the ROI region and background region on the basis of the probabilities, which state if the pixel of the current macroblock is more a ROI pixel or a background pixel.

31. The computer program product according to claim 30, wherein the program code includes code means configured to discover if the ROI region inside the search area of the previous image frame shares some color content with the background region of the search area of the previous image frame, then to perform a shape matching procedure in order to find the best location for the current macroblock in the search area in the previous ROI mask.

32. The computer program product according to claim 31, wherein the program code includes code means configured to apply SAD method (Sum of Absolute Difference) in the shape matching procedure.

33. The computer program product according to claim 32, wherein the program code includes code means configured to perform the SAD method on a probability domain in which the best match is configured to be determined for the current macroblock in the search area defined for that.

34. The computer program product according to claim 25, wherein the program code includes code means configured to generate the ROI mask on the basis of the statistics of the color-content in the middle and around the defined area including the ROI.

35. The computer program product according to claim 34, wherein the program code includes code means configured to generate search areas inside and around the defined area and to analyze the local color-content between these areas in order to decide whether the pixels of the defined area belong to target or not.

36. The computer program product according to claim 34, wherein the program code includes code means configured to perform histogram-based matching for each pixel within the defined area and a binary dilation process in order to unify the neighborhood of the pixel in the ROI mask.

\* \* \* \* \*